United States Patent [19]

Hosoya et al.

[11] Patent Number: 5,560,202

[45] Date of Patent: Oct. 1, 1996

[54] EXHAUST GAS CLEANER SYSTEM FOR AN INTERNAL COMBUSTION ENGINE WITH CATALYTIC CONVERTER SUPPLIED WITH SECONDARY AIR

[75] Inventors: Yasuhiko Hosoya; Hirofumi Ohuchi; Tatsuhiko Takahashi, all of Himeji, Japan

[73] Assignee: Mitsubishi Denki Kabushiki Kaisha, Tokyo, Japan

[21] Appl. No.: 467,925

[22] Filed: Jun. 6, 1995

Related U.S. Application Data

[62] Division of Ser. No. 269,681, Jul. 1, 1994, Pat. No. 5,459,999.

[30] Foreign Application Priority Data

Jul. 5, 1993 [JP] Japan ................... 5-165690
Aug. 11, 1993 [JP] Japan ................... 5-199655
Aug. 25, 1993 [JP] Japan ................... 5-210370

[51] Int. Cl.⁶ .................................................. F01N 3/28
[52] U.S. Cl. ........................... 60/284; 60/285; 60/289
[58] Field of Search ........................... 60/284, 285, 289, 60/274

[56] References Cited

U.S. PATENT DOCUMENTS

| | | | |
|---|---|---|---|
| 4,023,359 | 5/1977 | Masaki | 60/285 |
| 4,098,078 | 7/1978 | Laurent | 60/290 |
| 5,211,011 | 5/1993 | Nishikawa et al. | 60/284 |
| 5,315,823 | 5/1994 | Nishikawa et al. | 60/285 |
| 5,435,129 | 7/1995 | Hosoya et al. | 60/289 |

OTHER PUBLICATIONS

U.S. Application Ser. No. 07/978,414, filed Nov. 18, 1992, GAU 3403.
U.S. Application Ser. No. 08/078,465, filed Jun. 18, 1993, GAU 3402.

*Primary Examiner*—Douglas Hart
*Attorney, Agent, or Firm*—Sughrue, Mion, Zinn, Macpeak & Seas

[57] ABSTRACT

Exhaust gas cleaner system for an automotive internal combustion engine includes an air introduction pipe 8 for introducing secondary air, heated initially by a heater 23, to the catalytic converter unit 7 mounted on the exhaust pipe 3. The ignition timings of the engine is retarded at least during the time when the secondary air is heated by the heater 23. Preferably, the number of ignition timings are counted by a counter modulo 5, for example, in the case of a four-cylinder engine, and the ignition timings are retarded when the counter content is 3 or 4, such that the ignition timings of the cylinders are retarded intermittently. Alternatively, the retardation of the ignition timings may be terminated before the introduction of the heated secondary air is terminated.

Where two first and second catalytic converter units 7a and 7b are provided, secondary air distributed by a change-over valve 10a is heated separately by heaters 23b and 23c.

To reduce the burden imposed on the engine, the generation of power by the AC generator 28 may be suspended when either the flow control valve 10b or the heater 23 is operated.

4 Claims, 20 Drawing Sheets

EXHAUST GAS CLEANER SYSTEM FOR AN INTERNAL COMBUSTION ENGINE WITH CATALYTIC CONVERTER SUPPLIED WITH SECONDARY AIR

This is a divisional of application Ser. No. 08/269,681 filed Jul. 1, 1994, now U.S. Pat. No. 5,459,999.

BACKGROUND OF THE INVENTION

This invention relates to exhaust gas cleaner systems including catalytic converters for cleaning the exhaust gas of the internal combustion engines, and more particularly to the secondary air introduction systems for introducing secondary air into the exhaust pipe of the engine for enhancing the cleaning efficiency of the catalytic converters.

Catalytic converters are provided on the exhaust pipe of the automotive internal combustion engines for cleaning the exhaust gas. When heated above the reaction temperature, the catalytic converters remove the noxious components efficiently from the exhaust gas. Immediately after the start of the engine, however, the temperature of the catalytic converter is still low and hence the cleaning efficiency thereof is insufficient. To enhance the cleaning efficiency, fresh air (secondary air) is introduced into the exhaust pipe upstream of the catalytic converter. The air promotes the oxidation of noxious components such as HC (hydrogen carbide) and CO (carbon monoxide), and thereby raises the temperature of the catalytic converter quickly and enhances the cleaning efficiency (the efficiency to remove the noxious components) thereof.

FIG. 1 is a block diagram showing an internal combustion engine provided with a catalytic converter supplied with secondary air through an air introduction pipe. To an automotive internal combustion engine 1 are connected an air intake pipe 2 for supplying air to the engine and an exhaust pipe 3 for exhausting the exhaust gas to the atmosphere. The exhaust gas contains noxious components generated by the combustion within the cylinders of the internal combustion engine 1. The noxious components include nitrogen oxides ($NO_x$) which are produced in abundance at higher temperatures and should be reduced by the catalytic converter for removal, and HC (hydrogen carbide) and CO (carbon monoxide), which are produced in abundance at lower temperatures and should be oxidized by the catalytic converter for removal.

At an upstream point of the air intake pipe 2 is disposed an air cleaner 4 for removing dusts contained in the air supplied to the cylinders of the engine. To the downstream side of the air cleaner 4 is mounted an airflow sensor 5 for measuring the flow rate of air taken into the cylinders of the internal combustion engine 1. Further downstream of the airflow sensor 5 is disposed a throttle valve 6 for adjusting the amount of airflow supplied to the cylinders of the engine.

At a middle point of the exhaust pipe 3 is disposed a catalytic converter unit 7 accommodating the catalytic converter (e.g., catalytic converter rhodium) for cleaning the exhaust gas by means of chemical reactions. An air introduction pipe 8 is coupled across a point of the air intake pipe 2 downstream of the air cleaner 4 and a point of the exhaust pipe 3 upstream of the catalytic converter unit 7. An air pump 9 forces the air from the air intake pipe 2 into the exhaust pipe 3, and introduces the secondary air into the exhaust pipe 3. A check-valve 10 prevents the exhaust gas from reversing through the air introduction pipe 8 into the air intake pipe 2.

An air/fuel ratio sensor 11 on the exhaust pipe 3 detects the oxygen concentration of the exhaust gas. Fuel injectors 12 are provided for respective cylinders of the engine in the respective branches of the air intake pipe 2. From the output of a crank angle sensor 13 is detected the rpm of the engine. The outputs of the airflow sensor 5, the air/fuel ratio sensor 11, and the crank angle sensor 13 are supplied to an engine controller 14, which controls the operations of the fuel injectors 12 in response to the outputs of the sensors 5, 11 and 13. The ignition plugs (not shown) for the respective cylinders are supplied from an ignition coil 15. The current supply to the ignition coil 15 is controlled by an igniter 16, which is controlled by the engine controller 14.

The operation of the secondary air introduction system for the catalytic converter 7 of FIG. 1 is as follows. A part of the air passing through the air cleaner 4 is sucked into the air introduction pipe 8 by means of the air pump 9 and introduced, through the check-valve 10, into the exhaust pipe 3 at a point upstream of the catalytic converter unit 7. The secondary air thus introduced into the exhaust pipe 3 is mixed with the exhaust gas exhausted from the cylinders of the engine and then is passed together through the catalytic converter unit 7. The secondary air supplied through the air introduction pipe 8 promotes the oxidation of the noxious components such as HC and CO into corresponding innocuous compounds such as $H_2O$ (water) and $CO_2$ (carbon dioxide). The exhaust gas passed through the catalytic converter is released into the atmosphere.

The fuel injectors 12 are controlled by the engine controller 14. The amount of the injected fuel is determined primarily on the basis of the output of the airflow sensor 5 and the rpm of the engine calculated from the output of the crank angle sensor 13. The amount of the injected fuel thus determined is corrected on the basis of the output of the air/fuel ratio sensor 11, etc., and the fuel injectors 12 are driven in accordance with the corrected amount.

The igniter 16 controls the ignition timings of the respective cylinders by turning on and off the current supplied to the ignition coil 15. The engine controller 14 controls the operation of the igniter 16 in response to the output of the airflow sensor 5 and the rpm of the engine. The air pump 9 is driven from the time when the engine is started to the time when it is stopped, and keeps on introducing the secondary air into the exhaust pipe 3.

As discussed above, the fresh air supplied through the secondary air introduction system of FIG. 1 promotes the oxidation of noxious component such as HC and CO and thereby quickens the temperature rise of the catalytic converter. Thus, the time needed for the activation of the catalyst is shortened (compared with the case where no secondary air introduction system is provided) and the cleaning efficiency of the catalytic converter rises relatively quickly.

However, the legal control against the noxious components contained in the exhaust gas is becoming increasingly strict. The exhaust gas regulation of California is an example. Thus further reduction of the noxious components in the exhaust gas is an urgent need.

FIG. 2 is a block diagram showing an internal combustion engine provided with two catalytic converter units supplied with secondary air through an air introduction pipe. The arrangement of FIG. 2 is disclosed, for example, in Japanese Laid-Open Utility Model Application (Kokai) No. 47-21018.

The exhaust gas cleaner system of FIG. 2 includes first and second catalytic converter units 7a and 7b. The second catalytic converter unit 7b is disposed downstream of the first catalytic converter unit 7a. The first and second catalytic converter units 7a and 7b accommodate the catalytic converter rhodium, respectively. The air introduction pipe 8 includes two branches for supplying separate amounts of secondary air to the first and second catalytic converter units 7a and 7b. The amounts of air supplied to the first and second catalytic converter units 7a and 7b are adjusted by a change-over valve 10a. In response to the output of a temperature sensor 21 disposed at the second catalytic converter unit 7b, a controller 22 controls the change-over valve 10a and thereby adjusts the amounts of the secondary air supplied to the first and second catalytic converter units 7a and 7b. The parts not shown in FIG. 2 are similar to those shown in FIG. 1.

The operation of the secondary air introduction system for the first and second catalytic converter units 7a and 7b of FIG. 2 is as follows. When the choke valve is operated to restrict the airflow through the air intake pipe 2 at the start of the engine, the air/fuel mixture supplied to the cylinders of the engine is rich in fuel content and the exhaust gas contains much HC and CO. Under this circumstance, the air sucked in by the air pump 9 from the air intake pipe 2 into the air introduction pipe 8 is divided by the change-over valve 10a into two portion supplied through the two branches to the first and second catalytic converter units 7a and 7b, respectively. The noxious components such as HC and CO are thus oxidized into innocuous components such as $H_2O$ and $CO_2$ both in the first and second catalytic converter units 7a and 7b, and are removed from the exhaust gas.

When the temperature of the first and second catalytic converters 7a and 7b rises and the catalysts are activated, the high temperature of the second catalytic converter unit 7b is detected by the temperature sensor 21. In response to the output of the temperature sensor 21, the controller 22 changes over the change-over valve 10a to turn off the supply of secondary air to the first catalytic converter unit 7a. The secondary air is thus supplied exclusively to the the second catalytic converter unit 7b. The first catalytic converter 7a thus begins to efficiently reduce the nitrogen oxides $NO_x$ contained in the exhaust gas to the nitrogen gas $N_2$. The remaining noxious components such as HC and CO are oxidized into innocuous components such as $H_2O$ and $CO_2$ exclusively in the second catalytic converter unit 7b.

Even the exhaust gas cleaning system of FIG. 2 is not sufficiently effective. Namely, at the initial time when the first and the second catalytic converters are still at a lower temperature, the air lower in temperature than the exhaust gas are introduced into the exhaust pipe 3 and mixed with the exhaust gas. The temperature of the exhaust gas is thus reduced, thereby slowing down the temperature rise of the catalytic converters and delaying the full activation thereof. The initial cleaning efficiency is thus reduced. Furthermore, the air is distributed initially in a fixed ratio to the first and the second catalytic converters. The $NO_x$, however, becomes increasingly abundant as the temperature of the internal combustion engine 1 rises. Until the change-over valve 10a is switched to turn off the air supply to the first catalytic converter unit 7a, this increasing amount of $NO_x$ are not removed efficiently.

FIG. 3 is a block diagram showing an internal combustion engine provided with a catalytic converter supplied with heated secondary air through an air introduction pipe. In FIG. 3, the internal combustion engine 1 is shown with a transmission 1a and an AC generator 28. As in the case of FIGS. 1 and 2, the air taken in through the air cleaner 4 is supplied to the cylinders of the internal combustion engine 1 through the air intake pipe 2. The amount of airflow is controlled by the throttle valve 6 in the air intake pipe 2. The exhaust gas is released to the atmosphere through the exhaust pipe 3 provided with a catalytic converter unit 7.

The air sucked in by the electric air pump 9a into the air introduction pipe 8a is introduced into the exhaust pipe 3 through a flow control valve 10b, a check-valve 10, and a heater 23. The flow control valve 10b controls the amount of the air introduced into the exhaust pipe 3 through the air introduction pipe 8a. The check-valve 10 prevents the exhaust gas from reversing through the air introduction pipe 8a. The heater 23 heats the air before introducing it into the exhaust pipe 3. The controller unit 24 controls the operation of the flow control valve 10b as well as the ON/OFF of the relays 26 and 27. The relays 26 and 27 control the supply of current from the battery 25 to the electric air pump 9a and the heater 23, respectively.

The operation of the secondary air introduction system for the catalytic converter unit 7 of FIG. 3 is as follows. As described above, immediately after the start of the engine, the air/fuel ratio is small and the air/fuel mixture is rich in fuel content. The exhaust gas thus contains large amounts of CO and HC. The catalytic converter is still below the reaction (activation) temperature and is not sufficiently activated yet.

Simultaneously with, or after a predetermined length of time after, the start of the engine, the controller unit 24 turns on the relay 26 for the electric air pump 9a, thereby supplying power from the battery 25 to the electric air pump 9a. The electric air pump 9a is thus driven and introduces the secondary air into the exhaust pipe 3 through the air introduction pipe 8a. Further, simultaneouly with, or after a predetermined length of time after, the start of the engine, the controller unit 24 turns on the relay 27 for the heater 23, thereby supplying power from the battery 25 to the heater 23. The heater 23 thus heats the secondary air before it is introduced into the exhaust pipe 3.

The heated secondary air introduced into the exhaust pipe 3 is supplied to the catalytic converter unit 7 together with the exhaust gas, and accelerates the temperature rise of the catalytic converter. The catalytic converter thus quickly reaches the reaction temperature and is activated. The noxious components such as CO and HC are converted into the innocuous components such as $CO_2$ and $H_2O$ in the catalytic converter unit 7. The exhaust gas passed through and cleaned by the catalytic converter is released to the atmosphere.

During the above operation, the electric air pump 9a and the heater 23 are operated simultaneously. The amount of consumed current is thus large, and the AC generator 28 keeps on charging the battery 25. As shown in FIG. 4, the amount of secondary air introduced into the exhaust pipe 3 remains substantially constant. The amount of secondary air is controlled by the flow control valve 10b in the air introduction pipe 8a.

The secondary air introduction system for the catalytic converter unit 7 of FIG. 3 has the following disadvantage. During operation, the electric air pump 9a and the heater 23 is supplied with current from the battery 25, which should thus be charged continually by the AC generator 28. As a result, the AC generator 28 constitutes a heavy load on the internal combustion engine 1. When the output of the internal combustion engine 1 is reduced (as when the engine is idling), the concentration of the noxious components in the exhaust gas increases due to the heavy load imposed by the AC generator 28.

SUMMARY OF THE INVENTION

It is therefore an object of this invention to provide an exhaust gas cleaner systems for cleaning the exhaust gas of an internal combustion engine which is capable of minimizing the amounts of the noxious components contained in the exhaust gas, especially during the time immediately after the engine is started.

The above object is accomplished in accordance with the principle of this invention by an exhaust gas cleaner system for an internal combustion engine comprising: a catalytic converter mounted on an exhaust pipe of the internal combustion engine; an air introduction pipe for introducing secondary air into the exhaust pipe at a point upstream of the catalytic converter; heater mounted on the air introduction pipe for heating the secondary air introduced into the exhaust pipe; and engine controller for controlling ignition timings of the internal combustion engine, the engine controller retarding the ignition timings at least during a part of an interval in which the secondary air heated by the heater is introduced into the exhaust pipe.

Preferably, the engine controller retards the ignition timing intermittently. Where the internal combustion engine is a multi-cylinder internal combustion engine, it is preferred that the engine controller comprises: an ignition counter for counting a number of occurrences of successive ignitions of cylinders of the multi-cylinder internal combustion engine, the ignition counter being reset to zero when the number of occurrences of successive ignitions reaches a predetermined number; wherein the engine controller retards ignition timings if and only if the number of occurrences of successive ignitions counted and stored in the ignition counter falls within a predetermined range.

Further, it is preferred that the engine controller terminates retarding the ignition timings before an introduction of the secondary air heated by the heater is terminated.

In accordance with the second aspect of this invention, the above object is accomplished by an exhaust gas cleaner system for an internal combustion engine comprising: a first and a second catalytic converter mounted on an exhaust pipe of the internal combustion engine, the second catalytic converter being disposed to a downstream point of the first catalytic converter; an air introduction pipe for introducing secondary air into the exhaust pipe, the air introduction pipe having a first and a second branch for introducing separate amounts of secondary air to the first and second catalytic converters, respectively; distributing means for distributing the separate amounts of the secondary air to the first and second catalytic converters through the first and second branches of the air introduction pipe, respectively; first and second heaters mounted on the first and second branches of the air introduction pipe for heating independently the separate amounts of the secondary air distributed to the first and second catalytic converters, respectively.

Preferably, the exhaust gas cleaner system comprises water temperature detector means for detecting a water temperature of the engine; and a controller, coupled to an output of the water temperature detector means, for controlling the distributing means, wherein, when an output of the water temperature detector means exceeds a first predetermined level, the controller controls the distributing means such that a ratio of a percentage of the separate amount of the secondary air distributed to the first catalytic converter to a percentage of the separate amount of the secondary air distributed to the second catalytic converter is reduced to zero. Then, the controller may control the distributing means such that: the ratio of the percentage of the separate amount of the secondary air distributed to the first catalytic converter to the percentage of the separate amount of the secondary air distributed to the second catalytic converter is initially equal to a ratio of capacities of the first and second catalytic converters at a start of the internal combustion engine; and the ratio of the percentage of the separate amount of the secondary air distributed to the first catalytic converter to the percentage of the separate amount of the secondary air distributed to the second catalytic converter is gradually reduced to zero as the output of the water temperature detector means rises to the first predetermined level.

Further, the controller may further control the operation of the first heater, such that the first heater, turned on at a start of the internal combustion engine, is turned off when the output of the water temperature detector means exceeds a second predetermined level lower than the first predetermined level. Still further, the controller may further control the operation of the second heater, such that the second heater, turned on at a start of the internal combustion engine, is turned off when the output of the water temperature detector means exceeds a third predetermined level higher than the first predetermined level.

Alternatively, the exhaust gas cleaner system may comprise: a controller for controlling the distributing means, wherein the controller controls the distributing means such that a ratio of a percentage of the separate amount of the secondary air distributed to the first catalytic converter to a percentage of the separate amount of the secondary air distributed to the second catalytic converter is reduced to zero at an end of first predetermined length of time after a start of the internal combustion engine. Then, preferably, the controller controls the distributing means such that: the ratio of the percentage of the separate amount of the secondary air distributed to the first catalytic converter to the percentage of the separate amount of the secondary air distributed to the second catalytic converter is initially equal to a ratio of capacities of the first and second catalytic converters at a start of the internal combustion engine; and the ratio of the percentage of the separate amount of the secondary air distributed to the first catalytic converter to the percentage of the separate amount of the secondary air distributed to the second catalytic converter is gradually reduced to zero toward the end of the first length of time.

Further, the controller may further control the operation of the first heater, such that the first heater, turned on at a start of the internal combustion engine, is turned off a second predetermined length of time before the end of the first predetermined length of time. Still further, the controller may further control the operation of the second heater, such that the second heater, turned on at a start of the internal combustion engine, is turned off a third predetermined length of time after the end of the first predetermined length of time.

According to a third aspect of this invention, the above object is accomplished by an exhaust gas cleaner system for an internal combustion engine comprising: a battery means; a generator means for charging the battery means, the generator means being driven by the internal combustion engine to generate electric power; a catalytic converter mounted on an exhaust pipe of the internal combustion engine; an air introduction pipe for introducing secondary air into the exhaust pipe at a point upstream of the catalytic converter; an electric air pump mounted on the air introduction pipe for forcing the secondary air toward the exhaust pipe, the electric air pump being supplied with power from the battery means; an electric heater mounted on the air introduction pipe for heating the secondary air introduced into the exhaust pipe, the electric heater being supplied with power from the battery means; and engine controller for controlling operation of the generator means, wherein the engine controller suspends generation of power performed by the generator means when at least either the electric air pump or the heater is being operated with power supplied from the battery means.

Preferably, the engine controller suspends generation of power by the generator means only during the time when the internal combustion engine is within a predetermined length of time after a start. It is further preferred that the engine controller further comprises detector means for detecting output voltage of the battery means and resumes the generation of power by the AC generator when the output voltage of the battery means detected by the detector means falls below a predetermined level.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
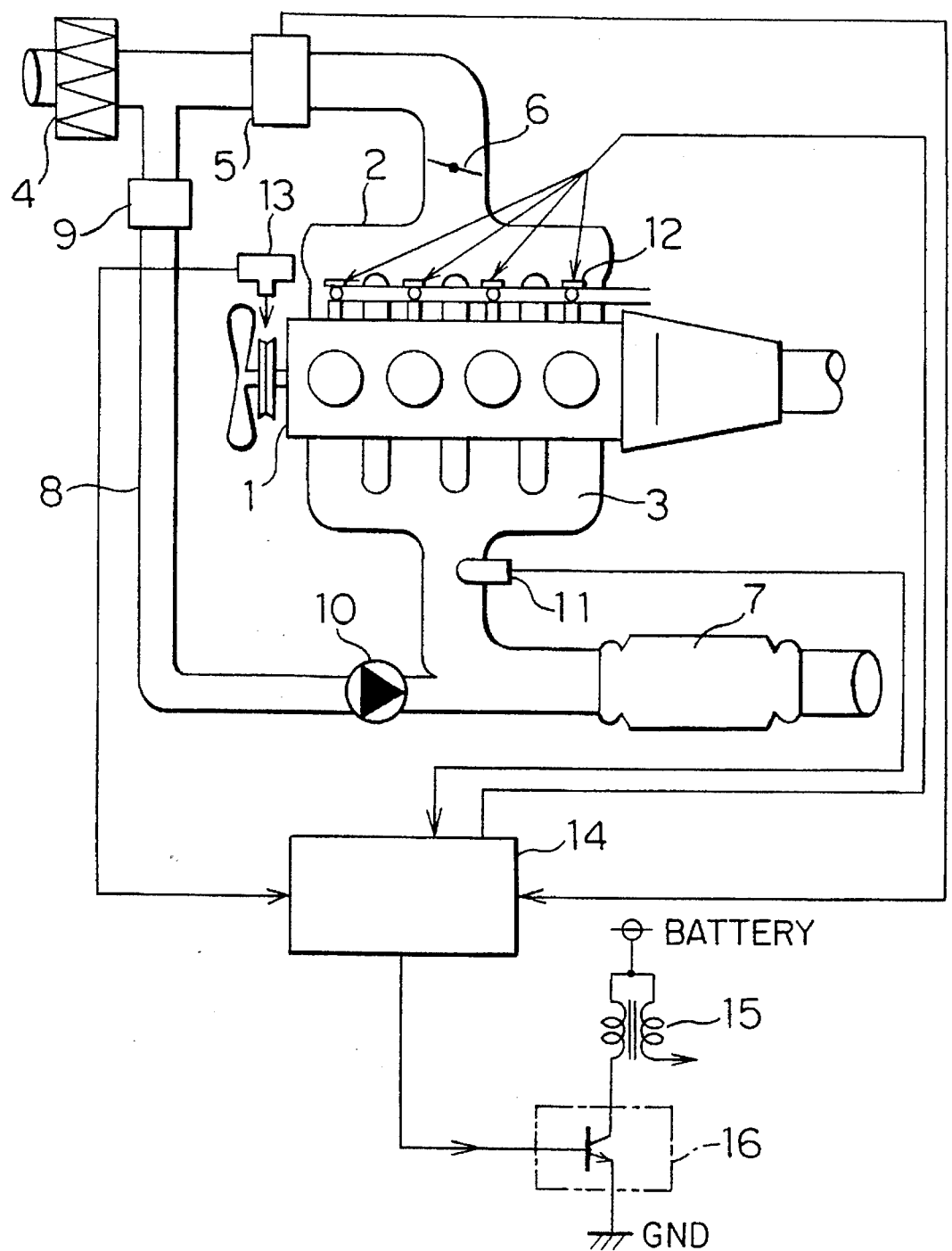
FIG. 1 is a block diagram showing an internal combustion engine provided with a catalytic converter supplied with secondary air through an air introduction pipe.
Figure 5:
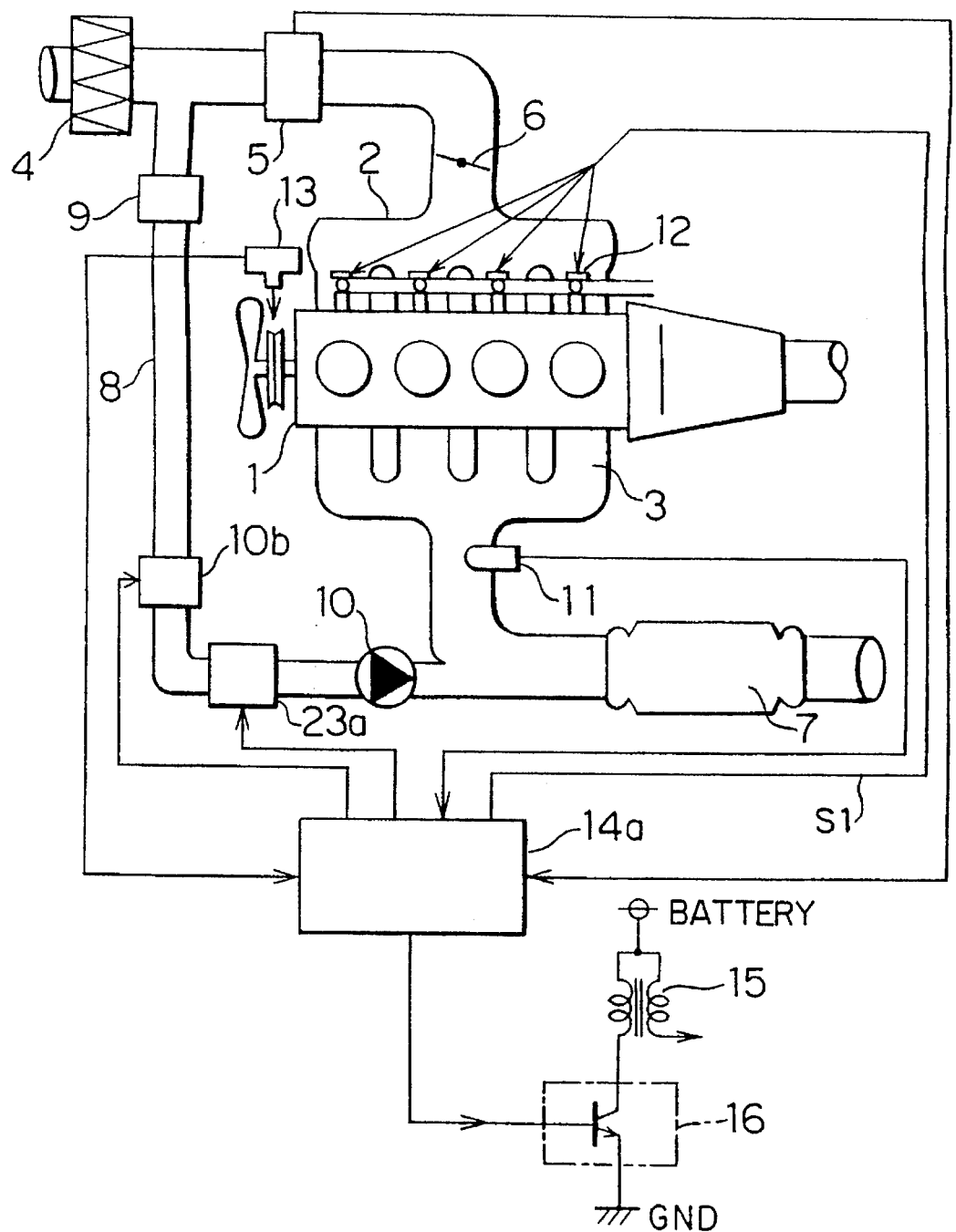
FIG. 5 is a block diagram showing an internal combustion engine provided with a catalytic converter supplied with heated secondary air through an air introduction pipe according to this invention.

FIG. 5 is a block diagram showing an internal combustion engine provided with a catalytic converter supplied with heated secondary air through an air introduction pipe according to this invention. The arrangement of FIG. 5 is similar to that of FIG. 1, except for the following points.

Figure 3:
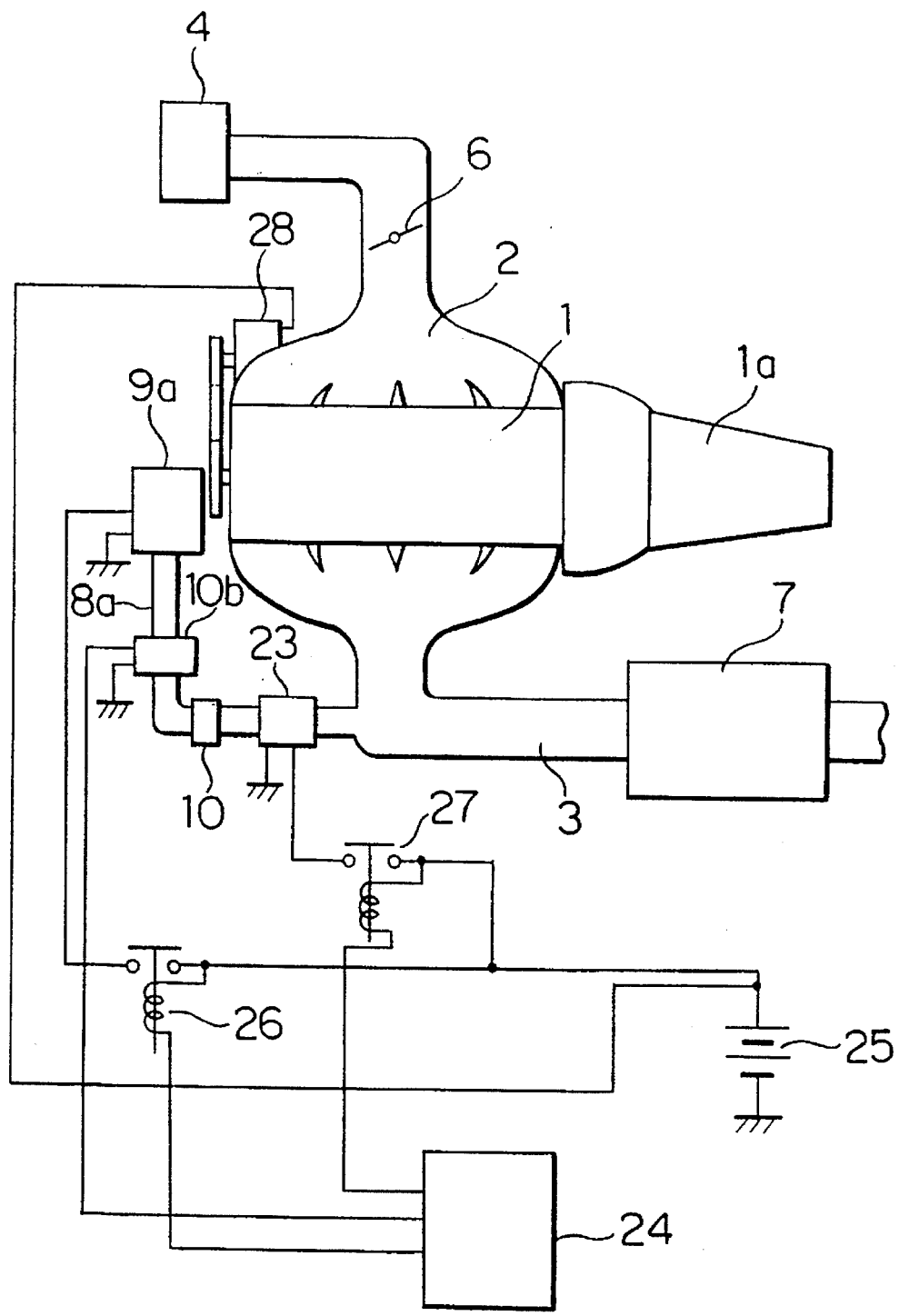
FIG. 3 is a block diagram showing an internal combustion engine provided with a catalytic converter supplied with heated secondary air through an air introduction pipe.
Figure 4:
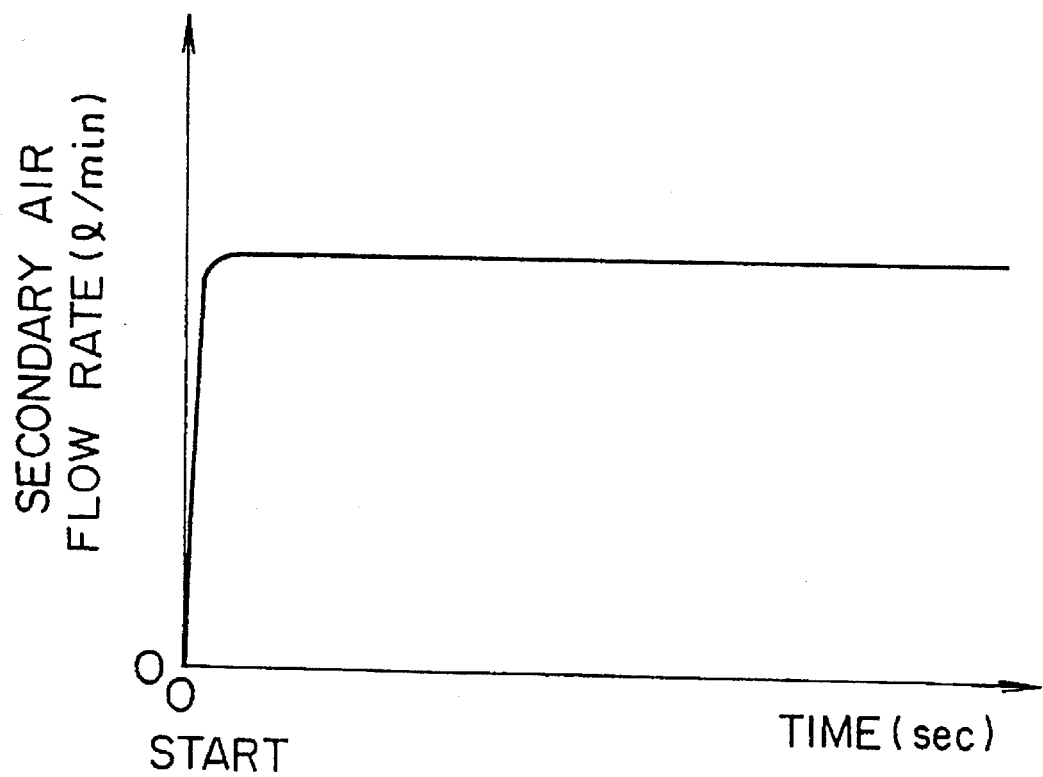
FIG. 4 is a diagram showing the change of the secondary air flow rate from the start of the engine.

In addition to the air pump 9 and the check-valve 10, the air introduction pipe 8 is provided with a flow control valve 10b and a heater 23a. The flow control valve 10b controls whether or not the secondary air is introduced into the exhaust pipe 3. The heater 23a heats the secondary air before it is introduced into the exhaust pipe 3. To the engine controller 14a are supplied the outputs of the airflow sensor 5, the air/fuel ratio sensor 11, and the crank angle sensor 13. In response thereto, the engine controller 14a controls the operations of the flow control valve 10b and the heater 23a as well as the operation of the fuel injectors 12. The details of the control is described below. It is noted that the air pump 9 may be a mechanical air pump which produces an airflow corresponding to the rpm of the engine. Further, the secondary air may be introduced directly from the atmosphere into the air introduction pipe 8 (as in the case of the arrangement of FIG. 3).

Figure 6:
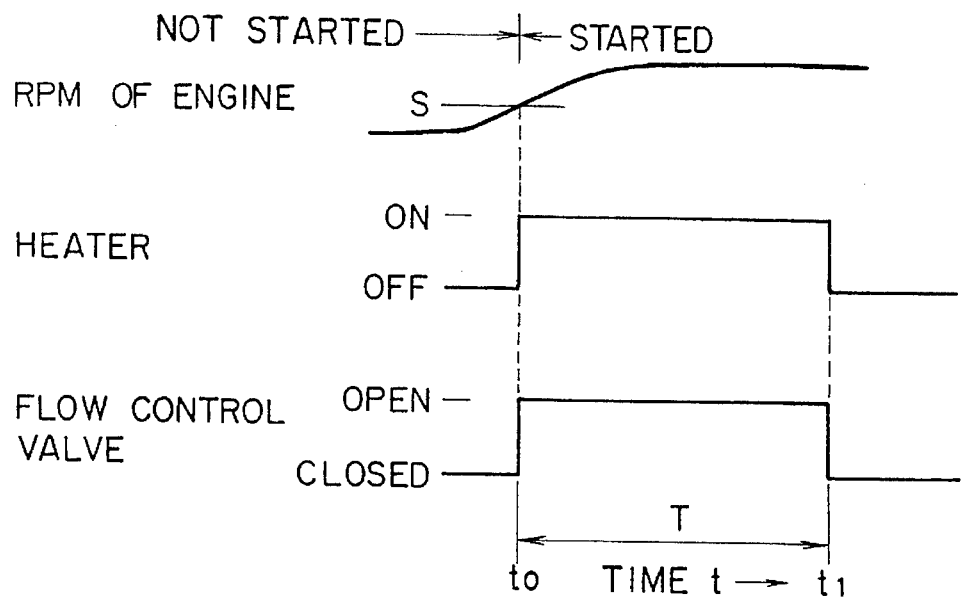
FIG. 6 is a timing chart showing the relationship among the rpm of the engine, the ON/OFF of the heater 23a, and the position of the flow control valve 10b of FIG. 5.

The operation of the system of FIG. 5 is as follows. FIG. 6 is a timing chart showing the relationship among the rpm of the engine, the ON/OFF of the heater 23a, and the position of the flow control valve 10b of FIG. 5. At the time point $t_0$, the rpm of the engine (the top waveform) reaches and exceeds a predetermined level S (e.g., 500 rpm), at which it is judged that the engine is started. Namely, it is judged that the engine is started when the rpm of the engine is above the predetermined level S, and not started when the rpm of the engine is thereunder. The rpm of the engine is calculated from the output of the crank angle sensor 13. During a predetermined length of time T from the time point $t_0$, the flow control valve 10b is opened (the bottom waveform), and the heater 23a is turned on (the middle waveform). At the time point $t_1$ at the end of the interval T, the flow control valve 10b is closed and the heater 23a is turned off. The flow control valve 10b and the heater 23a are controlled by the engine controller 14a. Thus, during the time length T after the engine is started, the secondary air heated by the heater 23a is introduced into the exhaust pipe 3, to accelerate the temperature rise of the catalytic converter 7.

Figure 7:
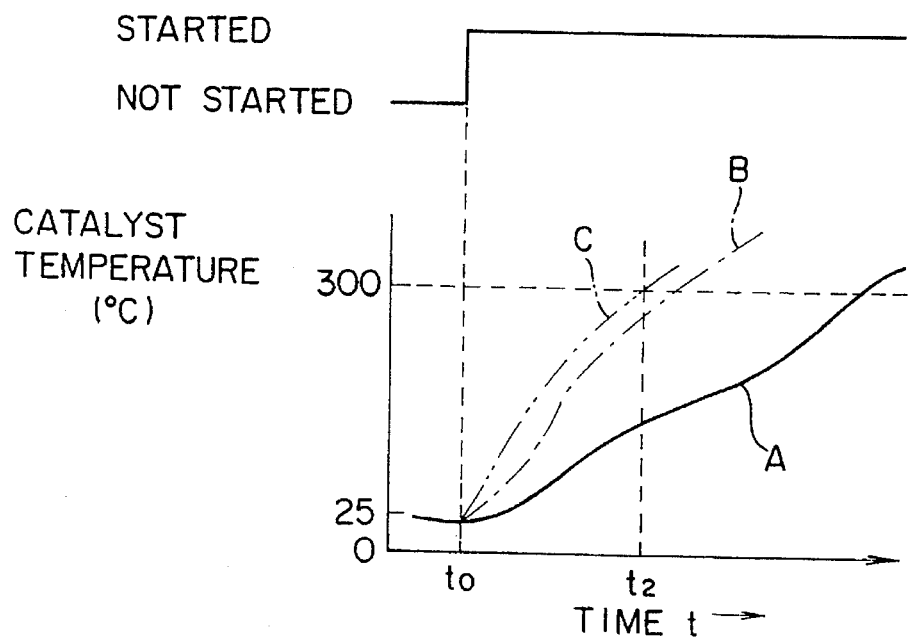
FIG. 7 is a diagram showing the temperature rise curves of the catalyst after the start of the engine in the three cases where: the ignition timing is controlled normally and the secondary air is not heated (solid curve A); the ignition timing is controlled normally while the secondary air is heated (dot-and-dash curve B); and the ignition timing is delayed and the secondary air is heated (two-dots-and-dash curve C)

Further, as described in detail below by reference to FIGS. 8 through 10, the ignition timings of the engine are retarded according to this invention. FIG. 7 is a diagram showing the temperature rise curves of the catalyst after the start of the engine in the three cases where: the ignition timing is controlled normally and the secondary air is not heated (solid curve A); the ignition timing is controlled normally while the secondary air is heated (dot-and-dash curve B); and the ignition timing is delayed and the secondary air is heated (two-dots-and-dash curve C). In FIG. 7, the activation temperature of the catalyst is shown at a representative level of 300 degrees. The comparison of the curves A and B shows clearly that the heating of the secondary air is effective in accelerating the temperature rise of the catalyst. As described below, the curve C represents the temperature rise of the catalyst according to this invention. The length of time T is selected long enough to encompass the interval between the time point $t_0$ at which the engine is started and the time point $t_2$ at which the curve C reaches and then rises above the activation temperature.

Figure 8:
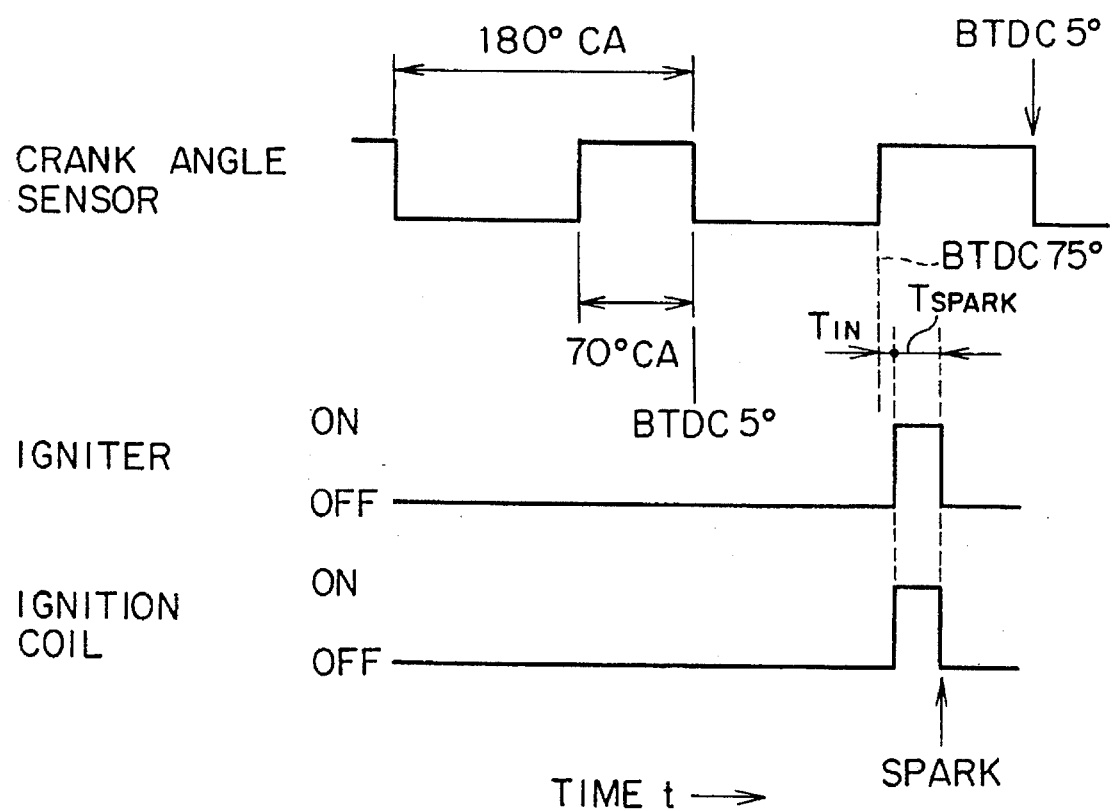
FIG. 8 is a timing chart showing the relationship among the output of the crank angle sensor 13, the ON/OFF of the igniter 16 and the ON/OFF of the ignition coil 15 of FIG. 5.

FIG. 8 is a timing chart showing the relationship among the output of the crank angle sensor 13, the ON/OFF of the igniter 16 and the ON/OFF of the ignition coil 15 of FIG. 5. It is assumed that the engine is a four-cylinder four-cycle engine. Thus, the crank angle sensor 13 outputs a pulse corresponding to a cylinder for each 180 degrees of the crank angle (see the top waveform). The pulse rises at 75 degrees, and falls at 5 degrees, before top dead center of the corresponding cylinder. The pulse width corresponds to 70 degrees of the crank angle. The rpm of the engine is calculated from the pulse repetition period of the output of the crank angle sensor 13.

The engine controller 14a turns on the igniter 16 after a time length $T_{IN}$ after the rising edge of a pulse of the output of the crank angle sensor 13 (i.e., at 75 degrees before top dead center of the corresponding cylinder), and turns it off after a time length $T_{SPARK}$ (see the middle waveform in FIG. 8). The current supply to the ignition coil 15 is turned on and off as the igniter 16 is turned on and off (see the bottom waveform in FIG. 8). When the current supply to the ignition coil 15 is turned off, a high voltage is induced across the secondary side of the ignition coil 15 to spark the ignition plug of the associated cylinder. During the initial time immediately after the start of the engine, the time length $T_{IN}$ is lengthened to retard the ignition timing according to this invention, as described in detail below.

Figure 9:
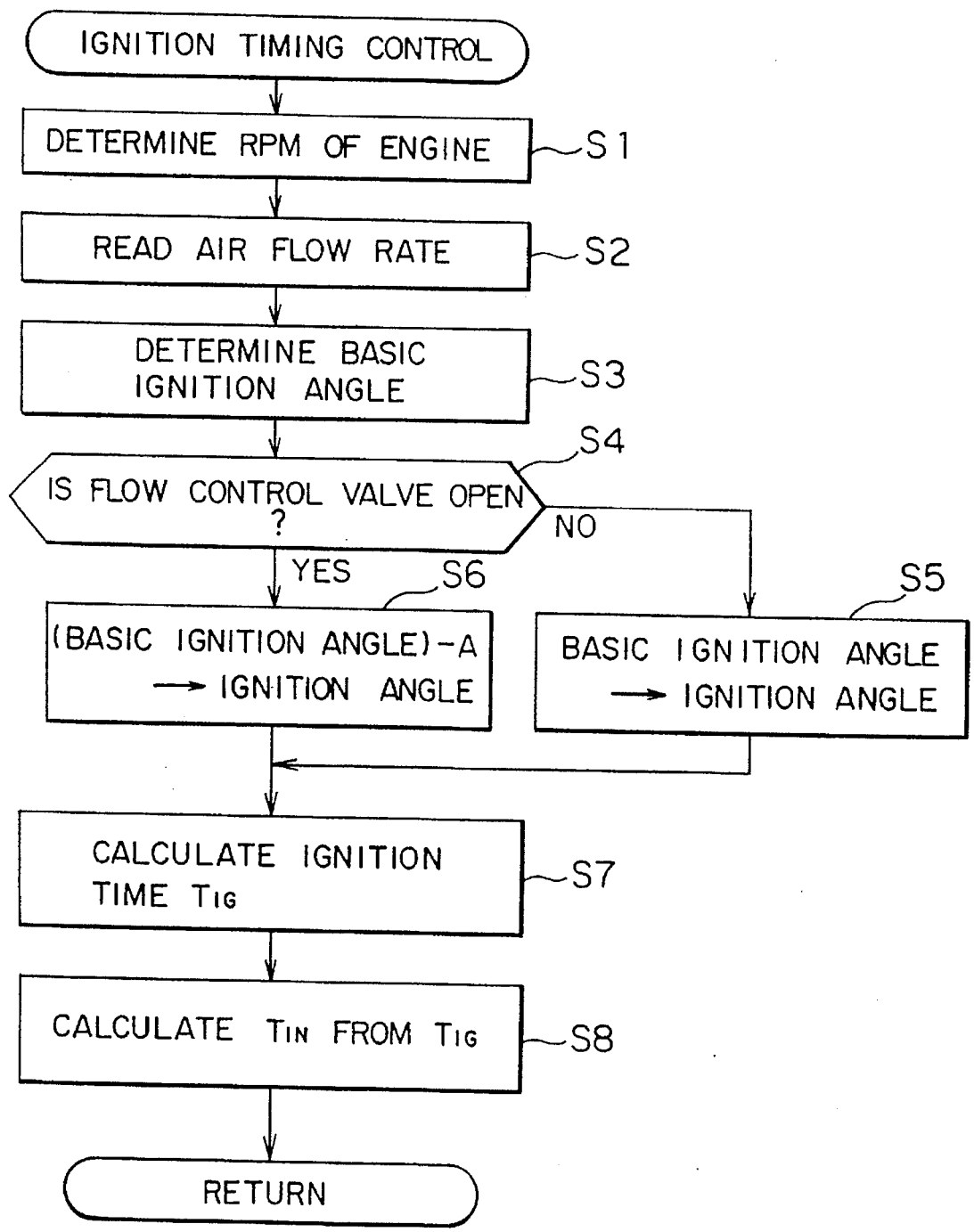
FIG. 9 is a flowchart showing the procedure by which the engine controller 14a determines the timings for turning on and off the igniter 16 of FIG. 5.

FIG. 9 is a flowchart showing the procedure by which the engine controller 14a determines the timings for turning on and off the igniter 16 of FIG. 5. At step S1, the engine controller 14a determines the rpm of the engine on the basis of the output of the crank angle sensor 13. Further at step S2, the engine controller 14a reads in the output of the airflow sensor 5 and determines the amount of air taken into the cylinders of the engine. At step S3, the engine controller 14a determines basic ignition angle (i.e., the crank angle before top dead center corresponding to the basic ignition timing). The basic ignition timing corresponds to the operating condition of the engine as determined from the rpm of the engine and the amount of air intake into the cylinders. The basic ignition angles (the crank angles before top dead center corresponding to basic ignition timings) are stored in a memory (e.g., a ROM) of the engine controller 14a in the form of a table. By looking up the table entry corresponding to the operating condition of the engine as determined from the rpm of the engine and the amount of air intake into the cylinders, the engine controller 14a determines the basic ignition angle.

At step S4, it is judged whether or not the flow control valve 10b is open. If the judgement is negative at step S4 (i.e., if the flow control valve 10b is closed and hence the secondary air is not introduced into the exhaust pipe 3), the execution proceeds to step S5 where the ignition angle (the crank angle before top dead center corresponding to the ignition timing) is set equal to the basic ignition angle determined at step S3. On the other hand, if the judgement is affirmative at step S4 (i.e., if the flow control valve 10b is open and hence the secondary air is introduced into the exhaust pipe 3), the execution proceeds to step S6, where the ignition angle (the crank angle before top dead center corresponding to the ignition timing) is retarded by a predetermined angle A from the basic ignition angle. Namely, the ignition angle is set equal to:

(basic ignition angle)—A.

After step S5 or step S6, the execution proceeds to step S7, where the ignition time is calculated from the ignition angle. Assuming that the engine is a four-cylinder four-cycle engine, the ignition time $T_{IG}$ is calculated by the formula:

$$T_{IG\ sec.} = \{(75° - I_A°)/180°\} \times 30\ sec./Ne$$

where $I_A$ is the ignition angle (the crank angle before top dead center corresponding to the ignition timing) determined at step S5 or step S6, and Ne is the rpm of the engine.

The ignition time $T_{IG}$ calculated at step S7 represents the length of time from the time point corresponding to 75 degrees before top dead center (i.e., the time point at the rising edge of a pulse of the output of the crank angle sensor 13) to the ignition timing at which the igniter 16 is turned off to spark the ignition plug. Thus, as shown in FIG. 8, the ignition time $T_{IG}$ calculated at step S7 is equal to the sum of: the time length $T_{IN}$ (which extends from the time point at 75 degrees before top dead center to the time point at which the igniter 16 is turned on), and the time length $T_{SPARK}$ (which extends from the time point at which the igniter 16 is turned on to the time point at which the igniter 16 is turned off). The time length $T_{SPARK}$ takes a fixed predetermined value. Thus, at step S8, the time length $T_{IN}$ is calculated by $$T_{IN} = T_{IG} - T_{SPARK}$$

Figure 10:
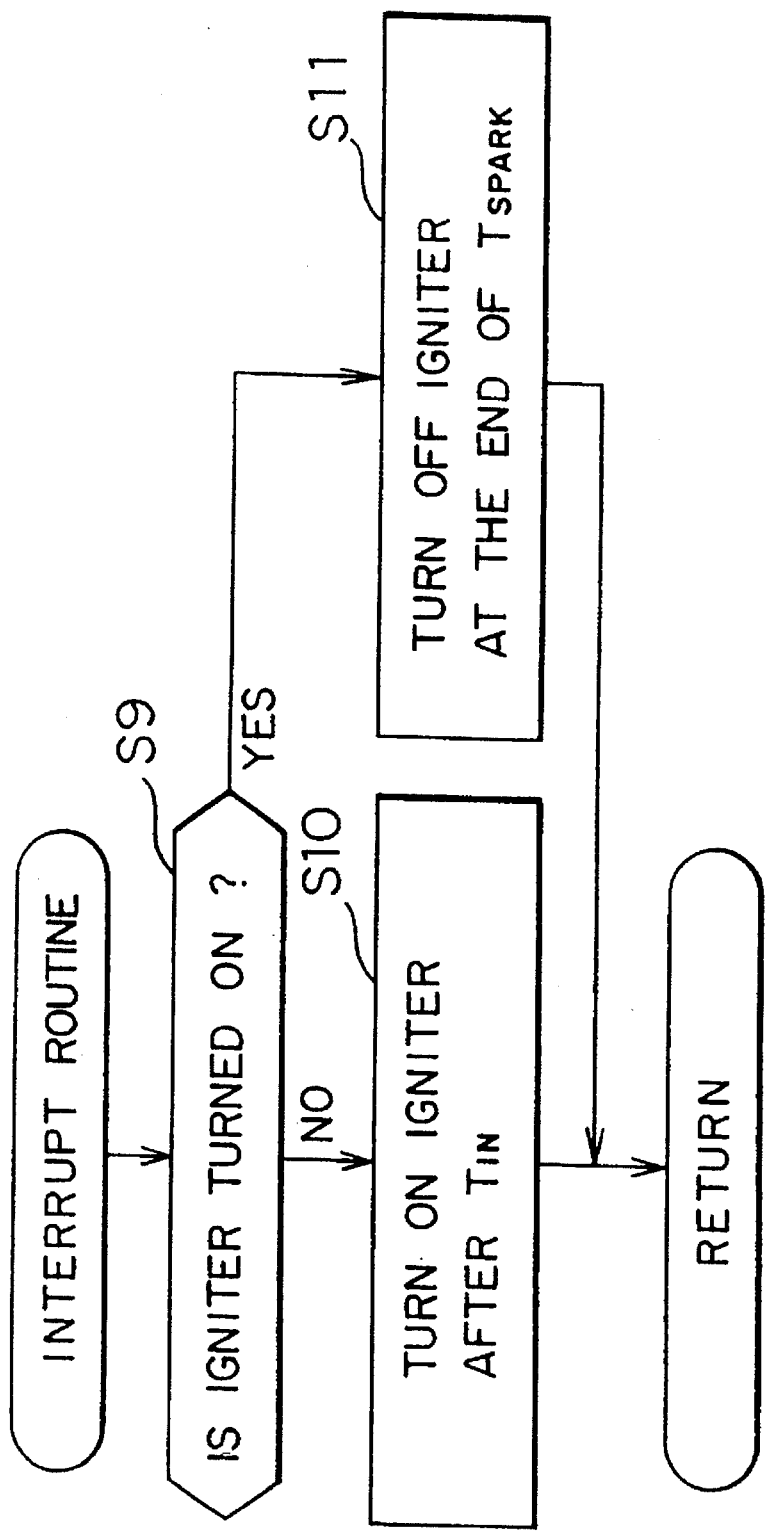
FIG. 10 is a flowchart showing the procedure by which the engine controller 14a controls the ON/OFF of the igniter 16 of FIG. 5.

FIG. 10 is a flowchart showing the procedure by which the engine controller 14a controls the ON/OFF of the igniter 16 of FIG. 5. At step S9, the engine controller 14a determines whether or not the igniter 16 is turned on. If the judgement is affirmative at step S9 (i.e., if the igniter 16 is turned on), the execution proceeds to step S11, where the igniter 16 is turned off at the end of the time length $T_{SPARK}$ (see FIG. 8). On the other hand, if the judgement is negative at step S9 (i.e., if the igniter 16 is turned off), the execution proceeds to step S10, where the igniter 16 is turned on after the time length $T_{IN}$ after the time point at 75 degrees before top dead center. The interrupt routine of FIG. 10 is executed at predetermined timings (i.e., at each time point at 75 degrees before top dead center and at each time point at which the igniter 16 is turned on).

Figure 11:
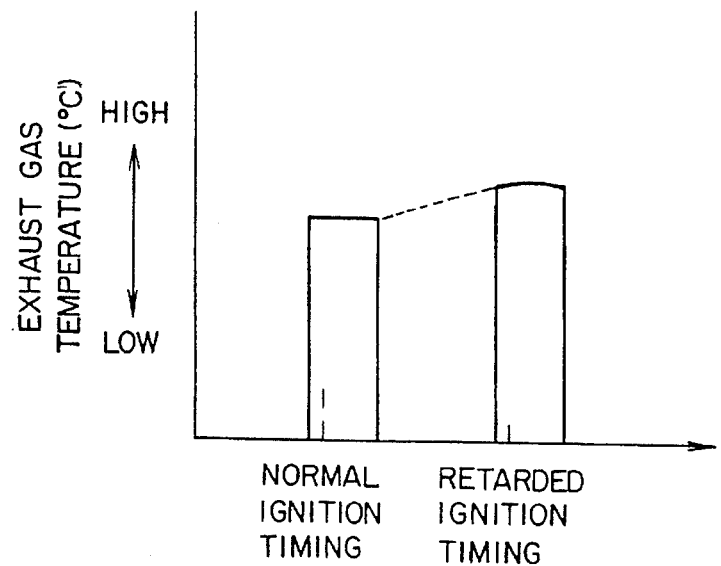
FIG. 11 compares the temperatures of the exhaust gas where the ignition timing is normal (the left column) and where the ignition timing is retarded (the right column)

FIG. 11 compares the temperatures of the exhaust gas where the ignition timing is normal (the left column) and where the ignition timing is retarded (the right column). (The normal ignition timing is the ignition timing determined from the basic ignition angle, and the retarded ignition timing is the ignition timing determined from the ignition angle which is retarded by the predetermined angle A from the basic ignition angle.) As shown in FIG. 11, the temperature of the exhaust gas rises when the ignition timing is retarded. Thus the temperature of the catalyst rises more quickly when the ignition timing is retarded. The comparison of the catalyst temperature curve B (representing the case where the ignition timing is controlled normally and the secondary air is heated) and the curve C (representing the case where the ignition timing is delayed and the secondary air is heated) in FIG. 7 shows that the retardation of the ignition timing according to this invention is effective in shortening the time required to raise the catalyst above the activation temperature. Thus, the exhaust gas cleaning system of FIG. 5 is effective in reducing the concentration of the noxious components in the exhaust gas.

In the case of the above described embodiment of FIG. 5, the ignition timings are retarded for all the cylinders. When, however, the ignition timings are retarded continuously for all the cylinders, the retardation of the ignition timings reduces the output torque of the engine. The drivability or the acceleration performance of the automobile is thus deteriorated.

Figure 12:
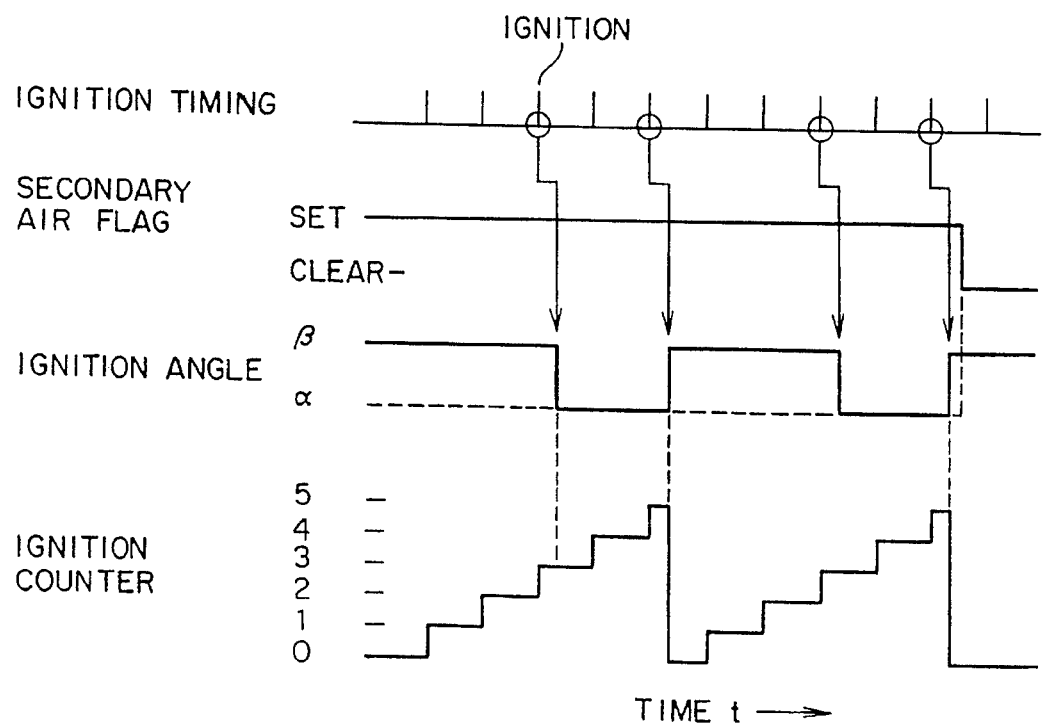
FIG. 12 is a timing chart showing the relationships among various waveforms in the case where the ignition timings are retarded intermittently by means of a counter to improve the accelerating performance of the vehicle.

FIG. 12 is a timing chart showing the relationships among various waveforms in the case where the ignition timings are retarded intermittently by means of a counter to improve the accelerating performance of the vehicle. The details of the operations relating to these waveforms will be described in detail below by reference to the flowcharts of FIGS. 13 and 14.

In FIG. 12, the top waveform represents the time points corresponding to 75 degrees before top dead center before the ignition timings. At 75 degrees before top dead center before each ignition timing, the ignition counter, provided in the engine controller 14a, is incremented (the bottom waveform). The secondary air introduction flag (the second waveform) is set when the flow control valve 10b is open, and is reset when the flow control valve 10b is closed. As shown by the solid curve in the third row in FIG. 12, the ignition angle is controlled normally (represented by β in FIG. 12) until the ignition counter exceeds Nn (Nn=3 in FIG. 12), and the ignition angle is retarded by an angle A (the retarded angle is represented by α in FIG. 12) when the ignition counter is from Nn up to, but not including, Nr (Nr=5 in FIG. 12), whereupon the ignition counter is reset to 0. Thus three cylinders are ignited successively at the normal ignition timings and then two cylinders are ignited successively at the retarded ignition timings. This cycle of three normal and two retarded ignition timing control is repeated until the secondary air introduction flag is cleared. The ignition counter serves as a modulo 5 counter, during the first three counts, 0, 1 and 2, of which the ignition timing is controlled normally, and during the second two counts, 3 and 4, of which the ignition timing is retarded. Thus, provided that the engine is a four-cylinder engine, the two cylinders whose ignition timings are retarded are successively changed as the cycle is repeated. By the way, the dotted curve in the third row in FIG. 12 shows the case where the ignition timings of all the cylinders are retarded continually.

Figure 13:
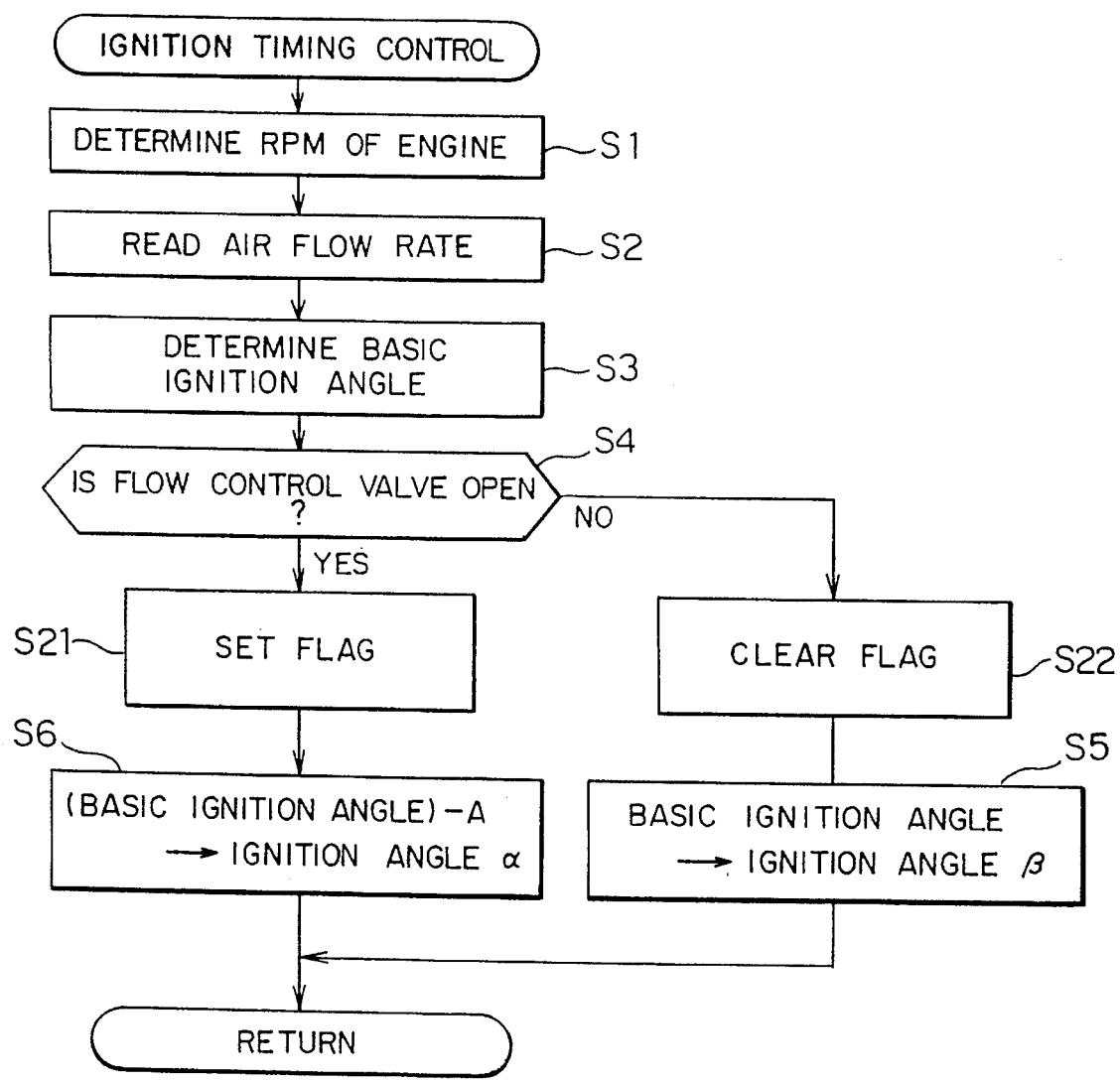
FIG. 13 is a flowchart showing the procedure by which the engine controller 14a sets or clears the secondary air introduction flag and determines the normal and retarded ignition timings.

FIG. 13 is a flowchart showing the procedure by which the engine controller 14a sets or clears the secondary air introduction flag and determines the normal and retarded ignition timings. At step S1, the engine controller 14a determines the rpm of the engine on the basis of the output of the crank angle sensor 13. Further at step S2, the engine controller 14a reads in the output of the airflow sensor 5 and determines the amount of air taken into the cylinders of the engine. At step S3, the engine controller 14a determines basic ignition angle (i.e., the crank angle before top dead center corresponding to the basic ignition timing). The basic ignition timing corresponds to the operating condition of the engine as determined from the rpm of the engine and the amount of air intake into the cylinders. The basic ignition angles (the crank angles before top dead center corresponding to basic ignition timings) are stored in a memory (e.g., a ROM) of the engine controller 14a in the form of a table. By looking up the table entry corresponding to the operating condition of the engine as determined from the rpm of the engine and the amount of air intake into the cylinders, the engine controller 14a determines the basic ignition angle.

At step S4, it is judged whether or not the flow control valve 10b is open. If the judgement is negative at step S4 (i.e., if the flow control valve 10b is closed and hence the secondary air is not introduced into the exhaust pipe 3), the execution proceeds to step S22 where the ignition counter is cleared. Thereafter the execution proceeds to step S5, where to the ignition angle β is assigned the basic ignition angle determined at step S3.

On the other hand, if the judgement is affirmative at step S4 (i.e., if the flow control valve 10b is open and hence the secondary air is introduced into the exhaust pipe 3), the execution proceeds to step S21, where the ignition counter is set. Thereafter the execution proceeds to step S6, where the ignition angle α is assigned the value: (basic ignition angle) —A.

Figure 14:
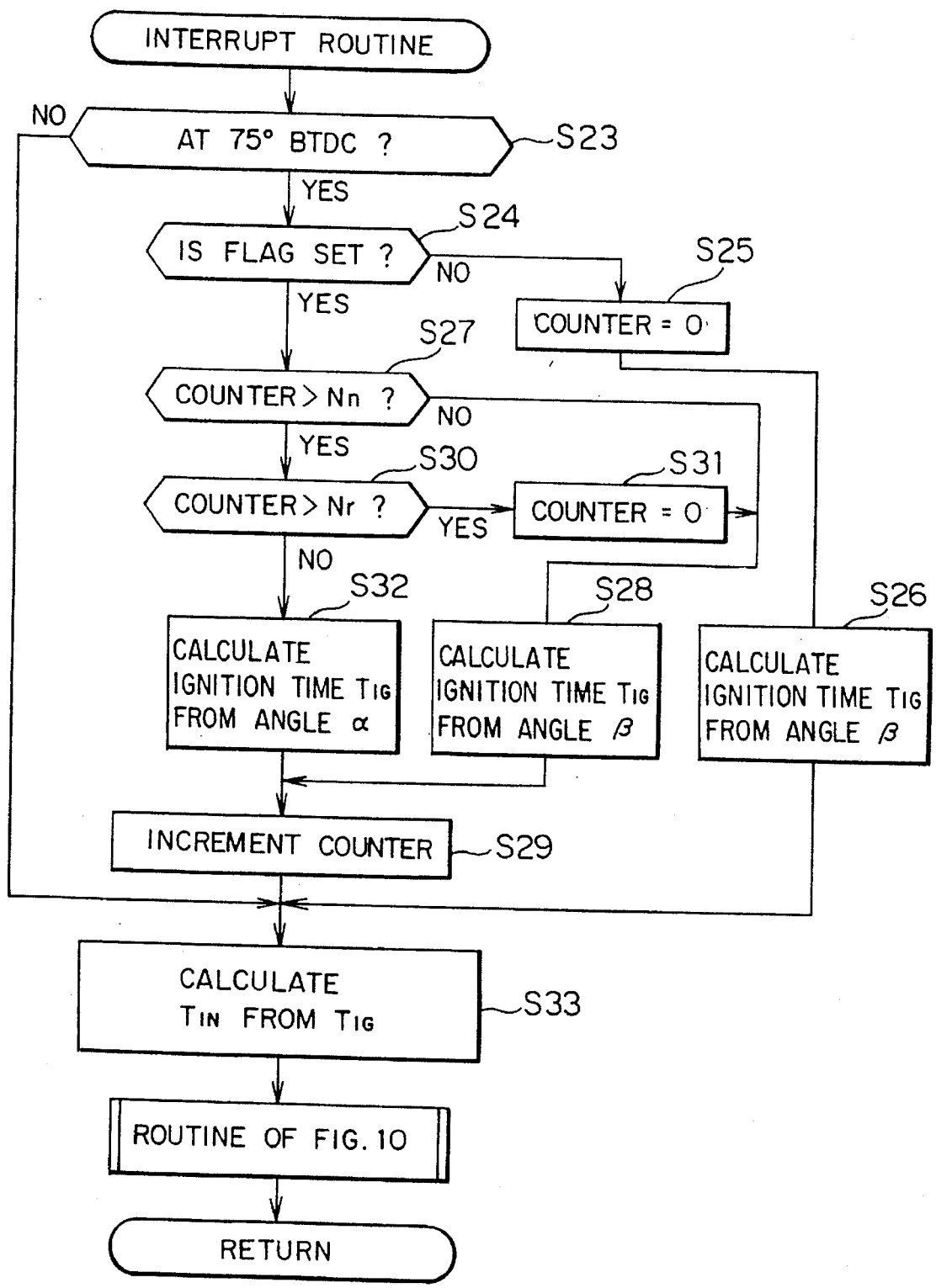
FIG. 14 is a flowchart showing the procedure for determining the ignition timings of the cylinders which are retarded intermittently.

FIG. 14 is a flowchart showing the procedure for determining the ignition timings of the cylinders which are retarded intermittently. The interrupt routine of FIG. 14 is executed at each 75 degrees before top dead center and when the igniter 16 is turned on at the end of the time length $T_{IN}$ (see FIG. 8). When executed at 75 degrees before top dead center, the routine controls the commencement of the current supply to the primary side of the ignition coil 15. On the other hand, when executed at the time the igniter 16 is turned on, the routine controls the interruption of the current supply to the primary side of the ignition coil 15.

At step S23, the engine controller 14a judges whether or not the interrupt occurred at 75 degrees before top dead center. If the judgement is negative at step S23, the execution proceeds to step S33, where the time length $T_{IN}$ from the time point corresponding to 75 degrees before top dead center to the ignition timing is calculated. When the execution proceeds to step S33, the ignition time $T_{IG}$ is already calculated during the previous execution cycle. Further, time length $T_{SPARK}$ during which the current is supplied to the ignition coil 15 is fixed. Thus, the time length $T_{IN}$ is calculated by:

$$T_{IN} = T_{IG} - T_{SPARK}$$

After step S33, the routine similar to that of FIG. 10 is performed.

On the other hand, if the judgement is affirmative at step S23 (i.e., if the interrupt occurred at 75 degrees before top dead center), the execution proceeds to step S24, where it is judged whether or not the secondary air introduction flag is set. If the judgement is negative at step S24 (i.e., if the secondary air introduction flag is not set and hence the heated secondary air is not being introduced into the exhaust pipe 3), the execution proceeds to step S25, where the ignition counter is reset to 0. Thereafter, at step S26, the ignition time $T_{IG}$ (which represents the length of time from the time point corresponding to 75 degrees before top dead center to the ignition timing) is calculated from the ignition angle β:

$$T_{IG\ sec.} = \{(75°-β°)/180°\} \times 30\ sec./Ne$$

where Ne is the rpm of the engine.

After step S26, the execution proceeds to step S33.

On the other hand, if the judgement is affirmative at step S24 (i.e., if the secondary air introduction flag is set and hence the heated secondary air is being introduced into the exhaust pipe 3), the execution proceeds to step S27, where it is judged whether or not the ignition counter is greater than the first predetermined number Nn. If the judgement is negative at step S27, the execution proceeds to step S28, where the ignition time $T_{IG}$ is calculated from the ignition angle β. On the other hand, if the judgement is affirmative at step S27, the execution proceeds to step S30, where it is judged whether or not the ignition counter is greater than the second predetermined number Nr. If the judgement is negative at step S30, the ignition time $T_{IG}$ is calculated from the ignition angle α:

$$T_{IG\ sec.} = \{(75°-α°)/180°\} \times 30\ sec./Ne$$

where Ne is the rpm of the engine.

If the judgement is affirmative at step S30 (i.e., if the ignition counter is greater than the second predetermined number Nr), the execution proceeds to step S31, where the ignition counter is reset to 0. Thereafter, the execution proceeds to step S28, where the ignition time $T_{IG}$ is calculated from the ignition angle β.

After step S28 or step S32, the execution proceeds to step S29, where the ignition counter is incremented. Thereafter, at step S33, the time length Thd IN is calculated from the ignition time $T_{IG}$.

After step S33, the engine controller 14a controls the igniter 16 in accordance with the procedure of FIG. 10.

In accordance with the control methods shown in FIGS. 13 and 14, the ignition timings are retarded intermittently until the introduction of the heated secondary air is terminated. The intermittent retardation of the ignition timing is effective in improving the drivability (accelerating performance) of the vehicle. Another method of improving the accelerating performance of the vehicle is terminating the retardation of the ignition timing a predetermined length of time before the introduction of the secondary air is terminated.

Figure 15:
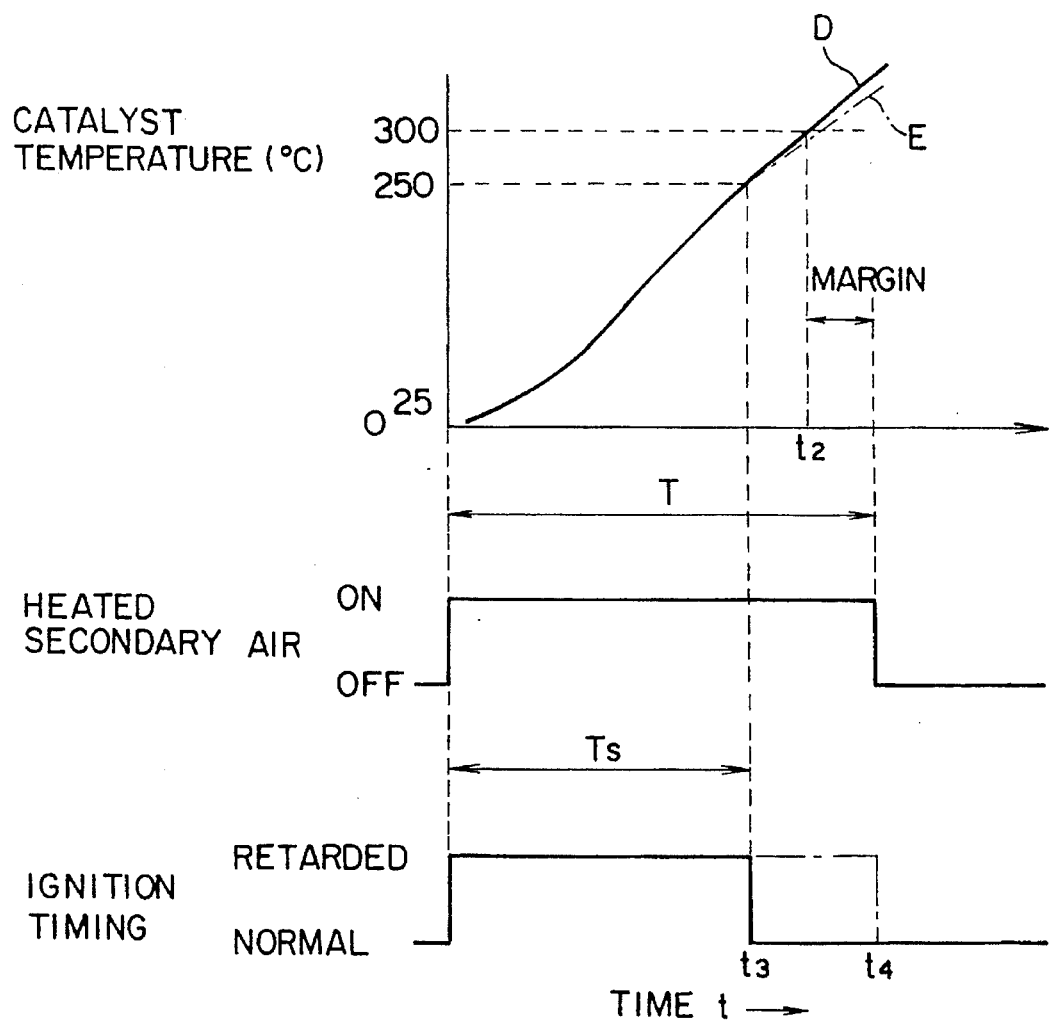
FIG. 15 is a diagram showing the ignition timing control method by which the retardation of the ignition timing is terminated a predetermined length of time before the introduction of the secondary air is terminated.

FIG. 15 is a diagram showing the ignition timing control method by which the retardation of the ignition timing is terminated a predetermined length of time before the introduction of the secondary air is terminated. Before the introduction of the secondary air into the exhaust pipe 3 is stopped at the time point $t_4$ at the end of the interval T (see the middle waveform in FIG. 15), the ignition timing is returned to the normal timing at time point $t_3$ (see the bottom waveform). The length of time $T_s$ during which the ignition timing is retarded is shorter than the length of time T during which the secondary air is introduced into the exhaust pipe 3. The solid curve D at the top of FIG. 15 represents the catalyst temperature rise in the case where the ignition timing is retarded until the time point $t_4$ at which the introduction of the secondary air is terminated. The dot-and-dash curve E represents the catalyst temperature rise in the case where the retardation of the ignition timing is terminated at the time point $t_3$. The length of time $T_s$ is selected such that the difference between the two temperature rise curves D and E is sufficiently small. It is noted that, as shown at the top in FIG. 15, a substantial margin is provided between the time point $t_2$ at which the curve D crosses the catalyst activation temperature of 300 degrees and the time point $t_4$ at which the introduction of the secondary air is terminated. The control method of the ignition timing in accordance with FIG. 15 is effective in improving the drivability (acceleration performance) of the vehicle.

Figure 2:
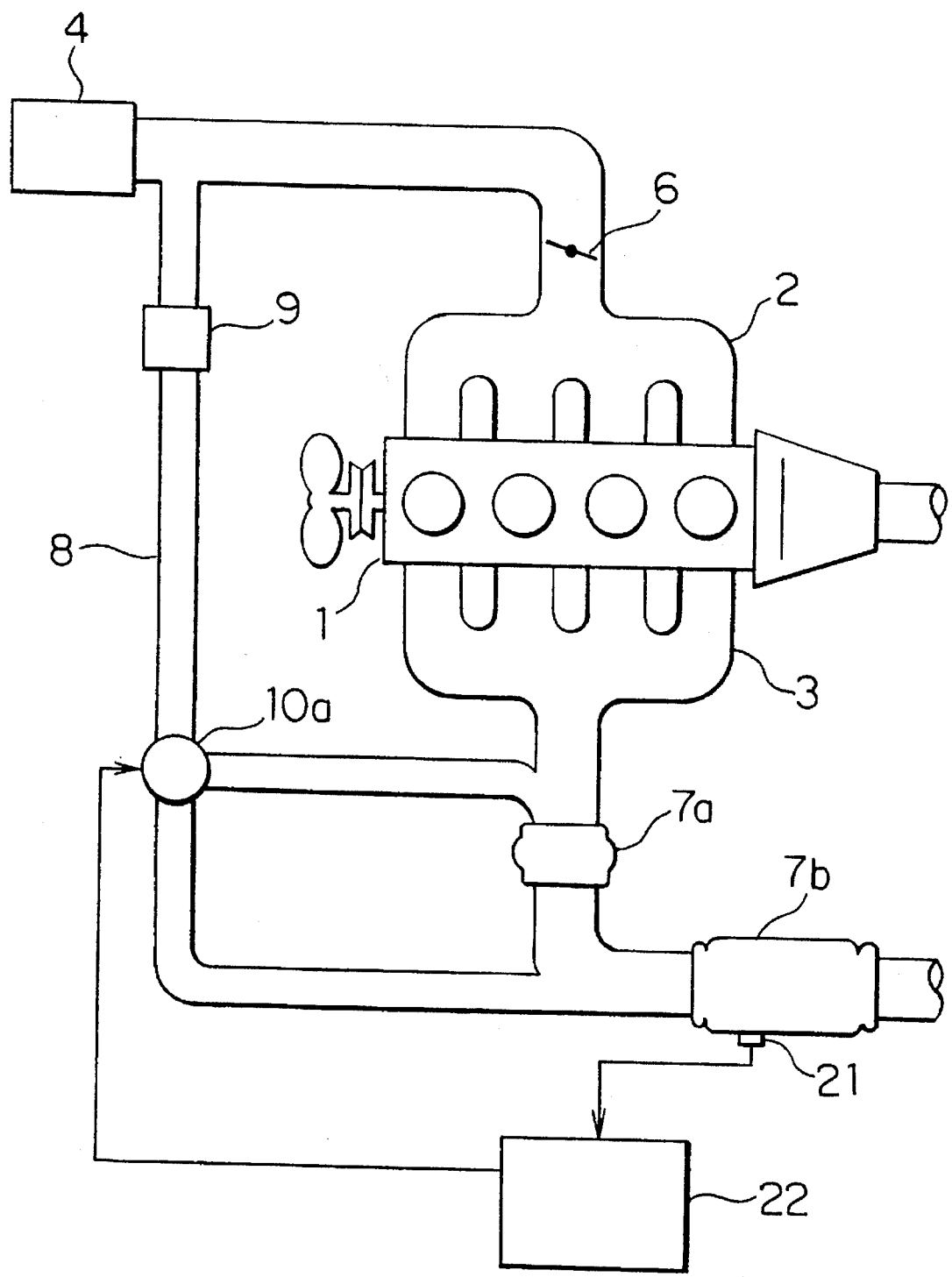
FIG. 2 is a block diagram showing an internal combustion engine provided with two catalytic converter units supplied with secondary air through an air introduction pipe.
Figure 16:
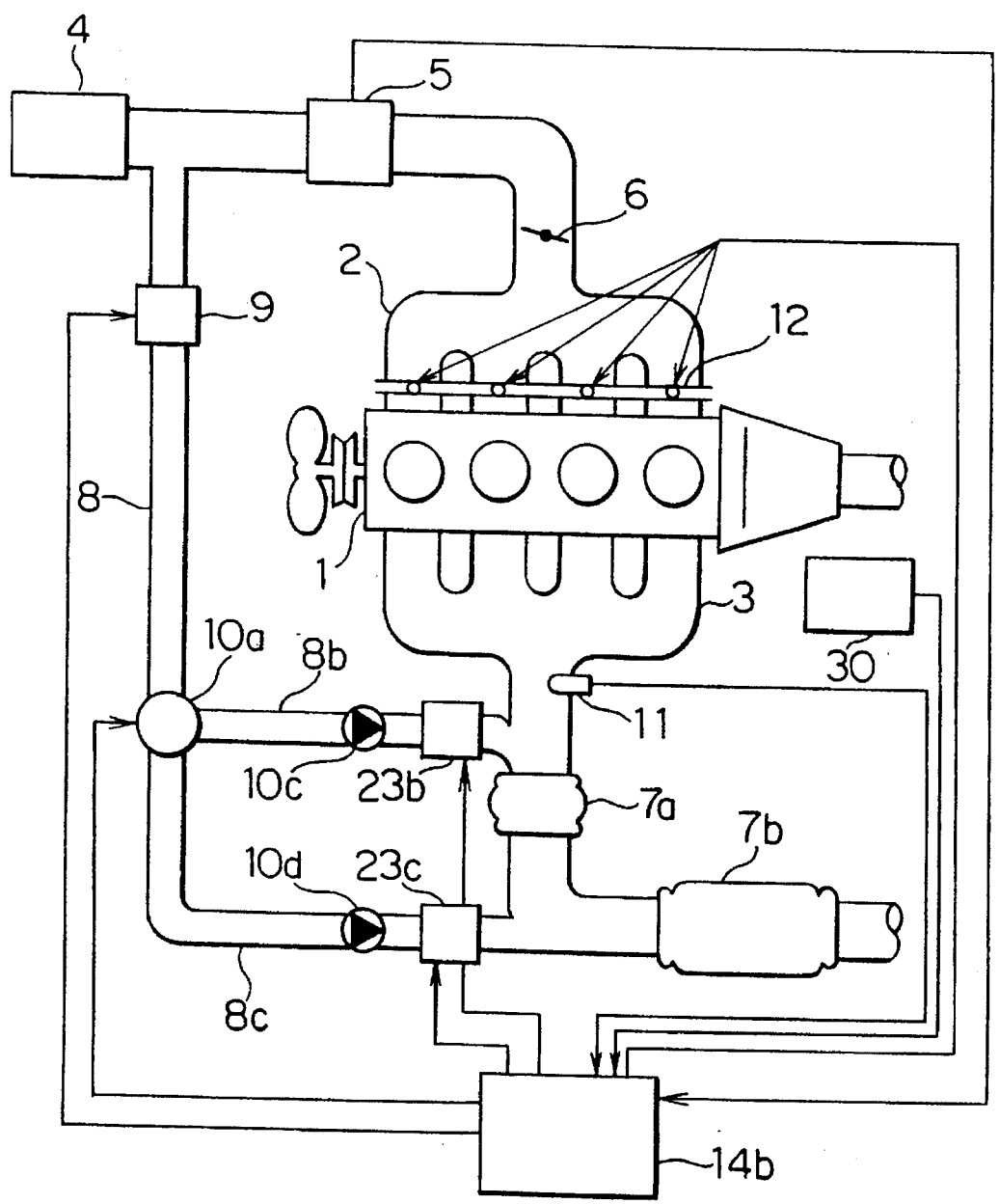
FIG. 16 is a block diagram showing an internal combustion engine provided with two catalytic converter units supplied with independently controlled amounts of heated secondary air through an air introduction pipe according to this invention.

FIG. 16 is a block diagram showing an internal combustion engine provided with two catalytic converter units supplied with independently controlled amounts of heated secondary air through an air introduction pipe according to this invention. The arrangement, of FIG. 16 is similar to that of FIG. 2, except where stated otherwise.

In FIG. 16, the fuel injectors 12 are provided for respective cylinders of the engine in the respective branches of the air intake pipe 2. The fuel injectors 12 are controlled by the engine controller 14b. An airflow sensor 5 disposed on the air intake pipe 2 upstream of the throttle valve 6 detects the rate of airflow taken into the cylinders of the internal combustion engine 1. An air/fuel ratio sensor 11 disposed on the exhaust pipe 3 detects the air/fuel ratio supplied to the cylinders from the oxygen concentration contained in the exhaust gas. A water temperature detector 30 detects the water temperature (the temperature of the water in the jacket surrounding the cylinders of the engine). The output signals of the airflow sensor 5, the air/fuel ratio sensor 11, and the water temperature detector 30 are supplied to the engine controller 14b.

The secondary air taken into the air introduction pipe 8 by means of the air pump 9 is distributed by the change-over valve 10a to the first and second branches 8b and 8c. The change-over valve 10a is capable of distributing the secondary air in a variable proportion to the two branches. The first branch 8b is provided a first check-valve 10c and a first heater 23b. The second branch 8c is provided a second check-valve 10d and a second heater 23c. The first heater 23b heats the secondary air introduced into the exhaust pipe 3 upstream of the first catalytic converter unit 7a. The first check-valve 10c prevents the reverse flow through the first branch 8b. The second heater 23c heats the secondary air introduced into the exhaust pipe 3 upstream of the second catalytic converter unit 7b. The second check-valve 10d prevents the reverse flow through the second branch 8c. The air pump 9, the change-over valve 10a, the first heater 23b, the second heater 23c are controlled by the engine controller 14b. The air pump 9 is preferably an electric air pump.

The engine controller 14b determines the basic fuel injection pulse width on the basis of the amount of air intake (the airflow rate) detected by the airflow sensor 5 and the rpm of the engine. Further, the engine controller 14b effects the temperature correction with respect to the basic fuel injection pulse width on the basis of water temperature in the jacket surrounding the cylinders of the engine. Further, performing the feedback correction of the air/fuel ratio on the basis of the output of the air/fuel ratio sensor 11 to adjust the air/fuel ratio to the thoretical air/fuel ratio, the engine controller 14b determines the injection pulse width and drives the fuel injectors 12 and controls the amount of injected fuel by means of the fuel injection signals.

Furthermore, the engine controller 14b controls the rpm of the air pump 9 to adjust the amount of secondary air taken into the air introduction pipe 8. Still further, in response to the temperature of the water in the jacket of the engine, the engine controller 14b controls the change-over valve 10a to adjust the ratio of the amounts of the secondary air distributed to the first and second catalytic converter units 7a and 7b, respectively. Still further, the engine controller 14b controls the current supply to the first and second heaters 26 and 27 (i.e., turns them on and off) to adjust the temperatures of the secondary air supplied to the first and second catalytic converter units 7a and 7b.

Next, the operation of the arrangement of FIG. 16 is described.

When the internal combustion engine 1 is still in the cold state immediately after it is started, the amount of the injected fuel is controlled by the engine controller 14b by the open loop control method to produce the air/fuel mixture richer than the theoretical air/fuel ratio. Thus, the exhaust gas contains abundance of noxious components, HC and CO, which are to be oxidized for removal. The first and second catalytic converters 7a and 7b, however, are both still not activated immediately after the engine is started. Thus, immediately after the start of the engine, the engine controller 14b operates the air pump 9 and controls the change-over valve 10a such that the secondary air is introduced to both the first and second catalytic converters 7a and 7b. The secondary air is heated by the heaters 23b and 23c, respectively, before introduction into the exhaust pipe 3. This prevents the temperature fall of the exhaust gas by the secondary air.

The exhaust gas is maintained at a high temperature and the oxidation reaction proceeds at the first and second catalytic converters 7a and 7b, such that the activation of the first and second catalytic converters 7a and 7b is promoted. As a result, the noxious components generated immediately after the start of the engine, HC and CO, are oxidized efficiently into $CO_2$ and $H_2O$ by the oxygen contained in the secondary air. While the engine is in the cold state immediately after the start of the engine, the nitrogen oxides $NO_x$ are hardly generated. Thus, the secondary air is introduced not only to the second catalytic converter unit 7b but also to the first catalytic converter unit 7a, such that HC and CO are cleaned efficiently in both the catalytic converter units.

Figure 17:
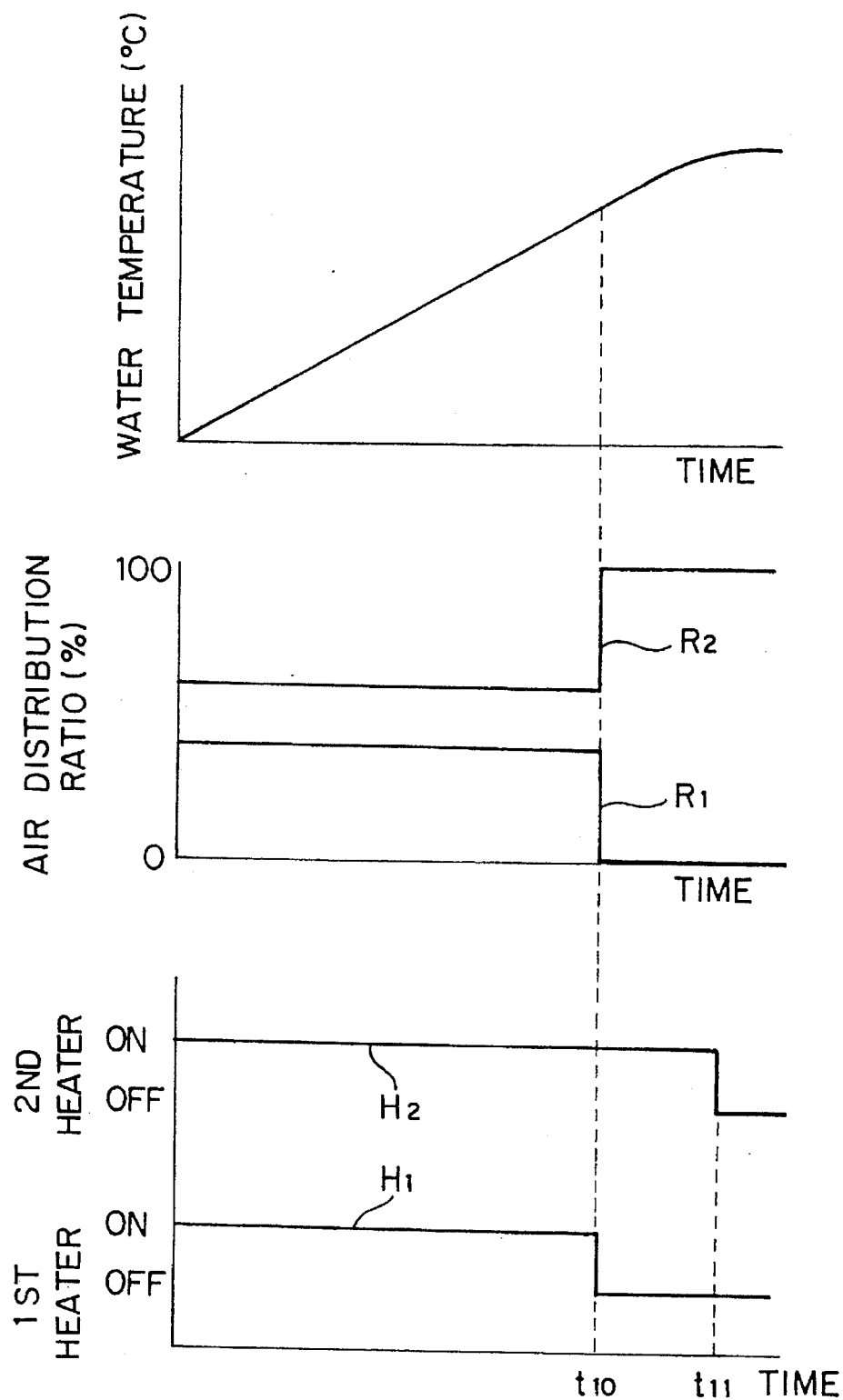
FIG. 17 is a timing chart showing the distribution ratio of the secondary air and the operations of the first and second heaters 23b and 23c in relation to the water temperature of the engine.

FIG. 17 is a timing chart showing the distribution ratio of the secondary air and the operations of the first and second heaters 23b and 23c in relation to the water temperature of the engine. The water temperature (the top curve) detected by the water temperature detector 30 rises gradually after the engine is started. Based on the water temperature detected by the water temperature detector 30, the engine controller 14b infers the temperature of the first catalytic converter unit 7a. When it is judged that the first catalytic converter 7a is activated (at the time point $t_{10}$ in FIG. 17), the engine controller 14b controls the change-over valve 10a such that the secondary air is introduced only to the second catalytic converter unit 7b. Thus, the percentage of the secondary air distributed to the first catalytic converter unit 7a (curve $R_1$) falls to 0 percent at the time point $t_{10}$, while the ratio of the secondary air distributed to the second catalytic converter unit 7b (curve $R_2$) rises to 100 percent at the same time point $t_{10}$. Before the time point $t_{10}$, the secondary air is distributed in a predetermined fixed ratio to the first and second catalytic converter units 7a and 7b. At the time point $t_{10}$, the first heater 23b is turned off (the curve $H_1$ in FIG. 17).

The second catalytic converter unit 7b, however, is situated downstream of the first catalytic converter unit 7a. As a result, the temperature of the exhaust gas introduced into the second catalytic converter unit 7b is lower than that of the exhaust gas introduced into the first catalytic converter unit 7a, and the activation of the second catalytic converter is delayed than that of the first catalytic converter. Thus, the second heater 23c is kept turned on (the curve $H_2$ in FIG. 17) to heat the secondary air introduced to the second catalytic converter unit 7b.

After the time point $t_{10}$, HC and CO are removed at the second catalytic converter unit 7b by means of the secondary air supplied thereto. The nitrogen oxides $NO_x$, the amounts of which increase as the engine warms up, are reduced to innocuous $N_2$ at the first catalytic converter unit 7a.

When the engine is further warmed and it is judged that the second catalytic converter is also activated, the engine controller 14b turns off the second heater 23c at the time point $t_{11}$ (see the curve $H_2$ in FIG. 17). After the time point $t_{11}$, the unheated secondary air at the room temperature is introduced to the second catalytic converter unit 7b. Thus, the nitrogen oxides $NO_x$ and a portion of HC and CO are removed by the oxidation and reduction reaction at the first catalytic converter unit 7a, and the remaining HC and CO are removed by the oxidation reaction at the second catalytic converter unit 7b. The heating of the secondary air introduced to the first and second catalytic converter units 7a and 7b immediately after the start of the engine promotes the activation of the first and second catalytic converters 7a and 7b and improves the cleaning efficiency of HC and CO.

In the case of the conventional system, the air pump is driven directly by the engine through a belt, etc., such that the amount of secondary air introduced into the exhaust pipe 3 may become inappropriate. In the case of the above embodiment of FIG. 16, however, the air pump 9 is controlled independently of the engine, such that the amount of secondary air introduced to the first and second catalytic converters 7a and 7b can be controlled appropriately and the cleaning efficiency is further improved. Although, in accordance with the method of operation shown in FIG. 17, a fixed amount of secondary air is introduced into the exhaust pipe 3, the amount of HC and CO contained in the exhaust gas changes in accordance with the operating condition of the engine, as described below.

First, the amount of exhaust gas is proportional to the amount of air taken into the cylinder. Thus, provided that the concentrations of HC and CO remain constant, the (absolute) amount of HC and CO increases when the amount of air intake into the cylinders increases. Thus, detecting the amount of air intake from the output of the airflow sensor 5, the engine controller 14b may adjust the output level air pump 9.

Second, when the injector pulse width is varied, the air/fuel ratio supplied to the cylinders and hence the concentrations of HC and CO contained in the exhaust gas change. Thus, the engine controller 14b may control the output level of the air pump 9 to adjust the amount of secondary air in response to the concentration of HC and CO in the exhaust gas. The injector pulse width and hence the concentration of HC and CO in the exhaust gas may vary due to the ON/OFF of the feedback control of the air/fuel ratio, and, during the feedback control of the air/fuel ratio, due to the variation of the output of the engine controller 14b.

Figure 18:
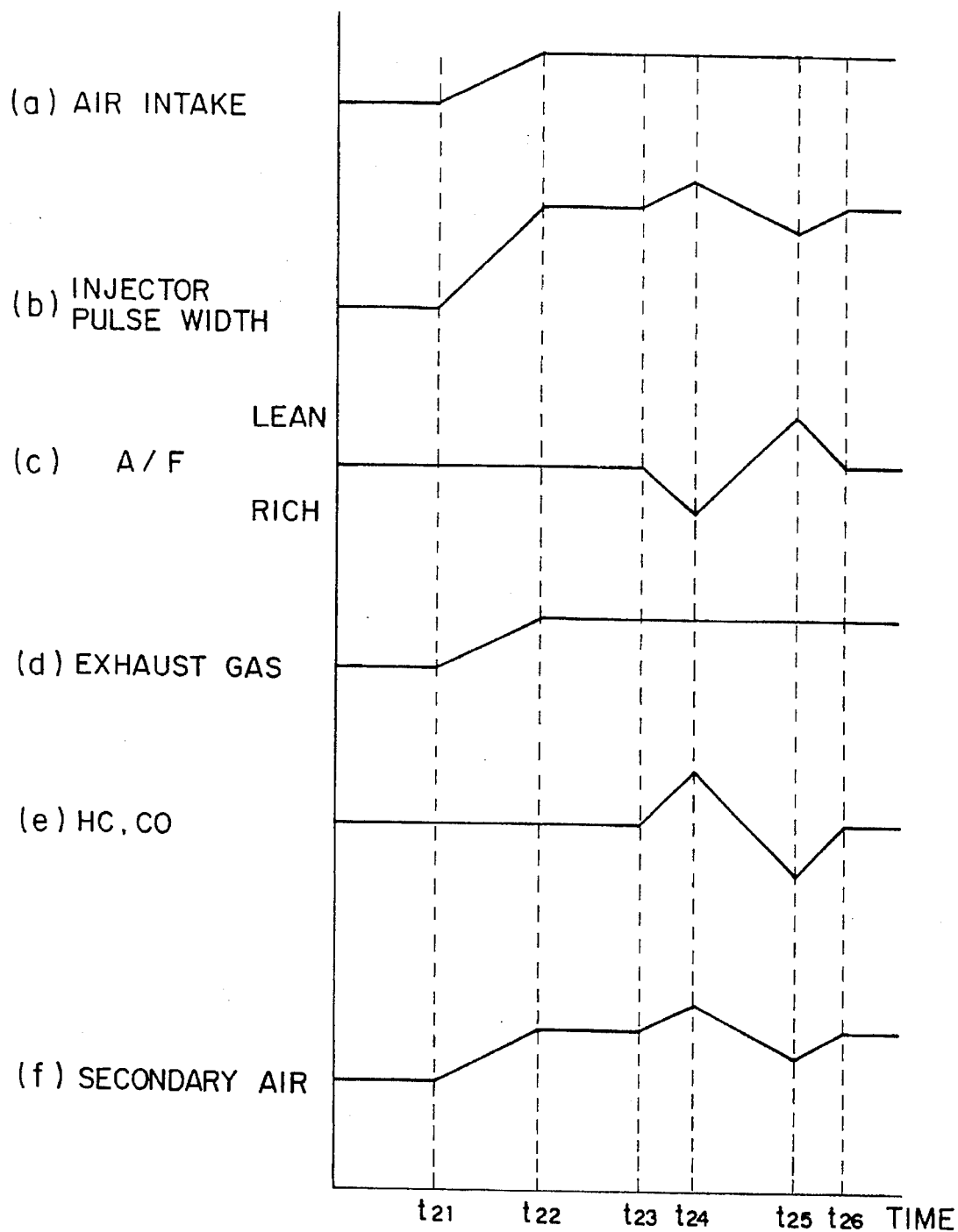
FIG. 18 is a timing chart showing the various waveforms occurring in the system of FIG. 16, in the case where the amount of secondary air introduced into the exhaust pipe 3 is varied in accordance with the amount of the exhaust gas and the injector pulse width.

FIG. 18 is a timing chart showing the various waveforms occurring in the system of FIG. 16, in the case where the amount of secondary air introduced into the exhaust pipe 3 is varied in accordance with the amount of the exhaust gas and the injector pulse width. At the time point $t_{21}$, the vehicle begins to be accelerated and the amount of air taken into the cylinders of the internal combustion engine 1 increases from the time point $t_{21}$ to the time point $t_{22}$, as shown by the curve at (a). The amount of exhaust gas (d) increases accordingly from the time point $t_{21}$ to the time point $t_{22}$. During the interval from the time point $t_{21}$ to the time point $t_{22}$, the engine controller 14b increases the amount of secondary air (f) in proportion to the amount of exhaust gas (d). During the same interval from the time point $t_{21}$ to the time point $t_{22}$, the driving pulse width (b) of the fuel injectors 12 (corresponding to the amount of fuel) is increased accordingly, such that the air/fuel ratio (c) and the concentration of HC and CO (e) remain substantially constant. During the interval from the time point $t_{22}$ to the time point $t_{23}$, the engine is in a stable state, and all the curves (a) through (f) are maintained substantially at the constant level. In particular, the air/fuel ratio (c) is maintained at the theoretical air/fuel ratio of 14.7. The pulse width of the fuel injectors 12 corresponding to the theoretical air/fuel ratio during this interval is taken as the standard or reference level for the subsequent control, and is designated as 100 percent level.

After the time point $t_{23}$, the injector pulse width (b) is varied from the reference level of 100 percent. Namely, from the time point $t_{23}$ to the time point $t_{24}$, the injector pulse width (b) is increased; from the time point $t_{24}$ to the time point $t_{25}$ the injector pulse width is decreased; and from the time point $t_{25}$ to the time point $t_{26}$, the injector pulse width is increased again. The air/fuel ratio (c) rises (becomes lean) when the injector pulse width falls, and falls (becomes rich) when the injector pulse width rises. Accordingly, the concentration of HC and CO (e) rises and falls as the injector pulse width increases and decreases. Thus, for supplying the appropriate amount of oxygen needed to oxidize HC and CO contained in the exhaust gas, the amount of secondary air (f) is increased and decreased proportionally as the injector pulse width is increased and decreased.

Figure 19:
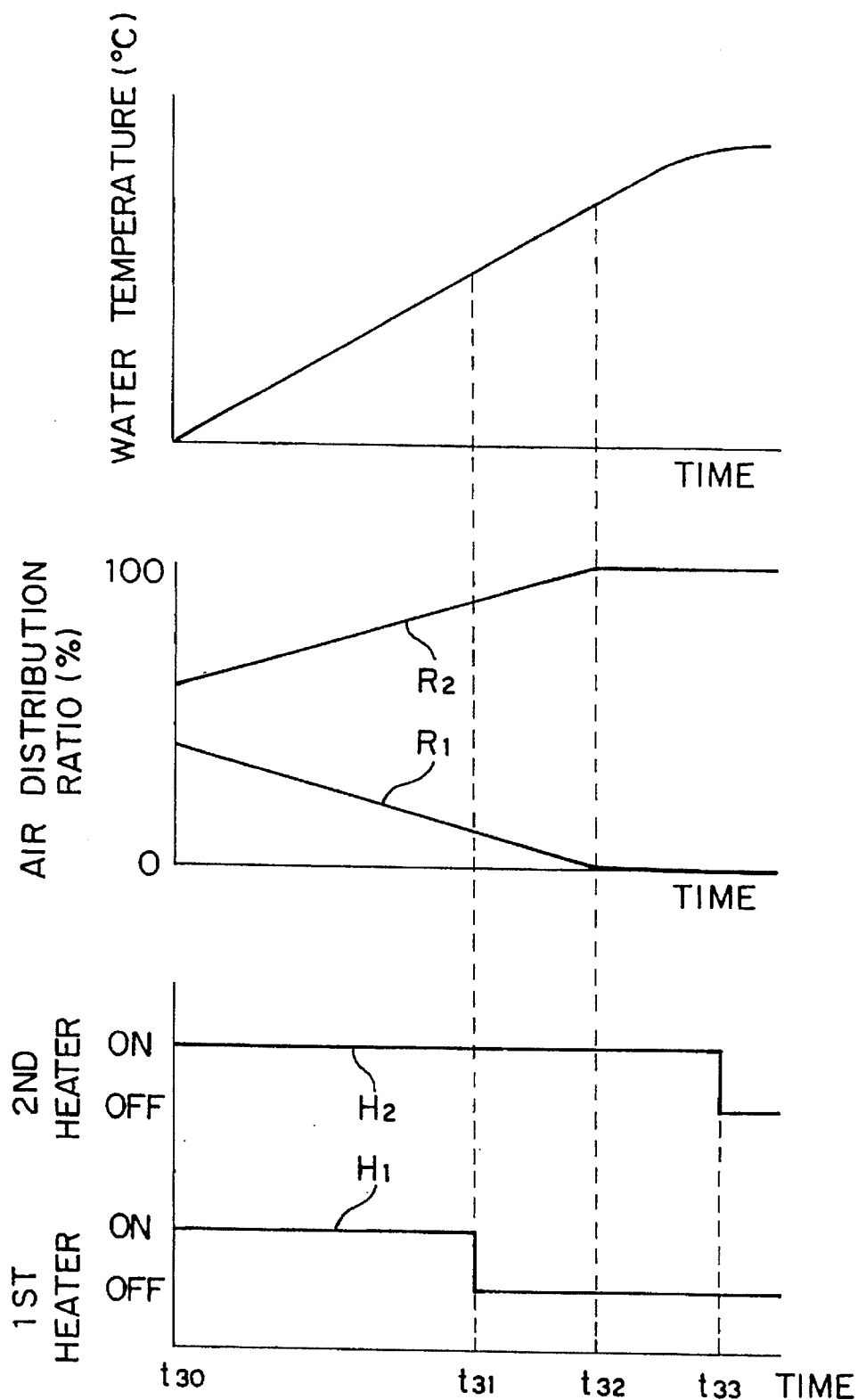
FIG. 19 is a timing chart showing the distribution ratio of the secondary air and the operations of the first and second heaters 23b and 23c in relation to the water temperature of the engine, in the case where the distribution ratio of the secondary air is varied gradually in response to the water temperature.

In the control method shown in FIG. 17, the secondary air is distributed in a fixed ratio to the first and second catalytic converter units 7a and 7b. FIG. 19 is a timing chart showing the distribution ratio of the secondary air and the operations of the first and second heaters 23b and 23c in relation to the water temperature of the engine, in the case where the distribution ratio of the secondary air is varied gradually in response to the water temperature. At the time point $t_{30}$ immediately after the start of the engine, the ratio of the percentage $R_1$ of the secondary air distributed to the first catalytic converter unit 7a to the percentage $R_2$ of the secondary air distributed to the second catalytic converter unit 7b is set equal to the ratio of the capacities of the first and second catalytic converter units 7a and 7b. Thereafter, as the water temperature rises, the percentage $R_1$ of the secondary air distributed to the first catalytic converter unit 7a is decreased gradually such that the amount of secondary air introduced to the first catalytic converter unit 7a vanishes when, at the time point $t_{32}$, the water temperature reaches the first predetermined level at which it is judged that the first catalytic converter has reached the activation temperature. Thus, the percentage $R_2$ of the secondary air distributed to the second catalytic converter unit 7b is increased gradually and reaches 100 percent at the time point $t_{32}$.

The first heater 23b is turned off when the water temperature of the engine rises to a second level (curve $H_1$). The engine controller 14b turns off the second heater 23c at the time point $t_{33}$ when the engine is further warmed and it is judged that the second catalytic converter is also activated (curve $H_2$). The engine controller 14b may turn off the second heater 23c when the output of the water temperature detector 30 reaches a predetermined third level higher than the first level corresponding to the time point $t_{32}$. Alternatively, the engine controller 14b may turn off the second heater 23c after a predetermined length of time after the time point $t_{32}$.

The amount of nitrogen oxides $NO_x$ increases as the temperature of the internal combustion engine 1 rises. In accordance with the control method of the change-over valve 10a as represented by the curves $R_1$ and $R_2$ in FIG. 19, the cleaning efficiency of the nitrogen oxides $NO_x$ by the first catalytic converter unit 7a is increased in accordance with the increasing amount of $NO_x$. The amount of $NO_x$ contained in the exhaust gas can thus be limited under a predetermined level.

Figure 20:
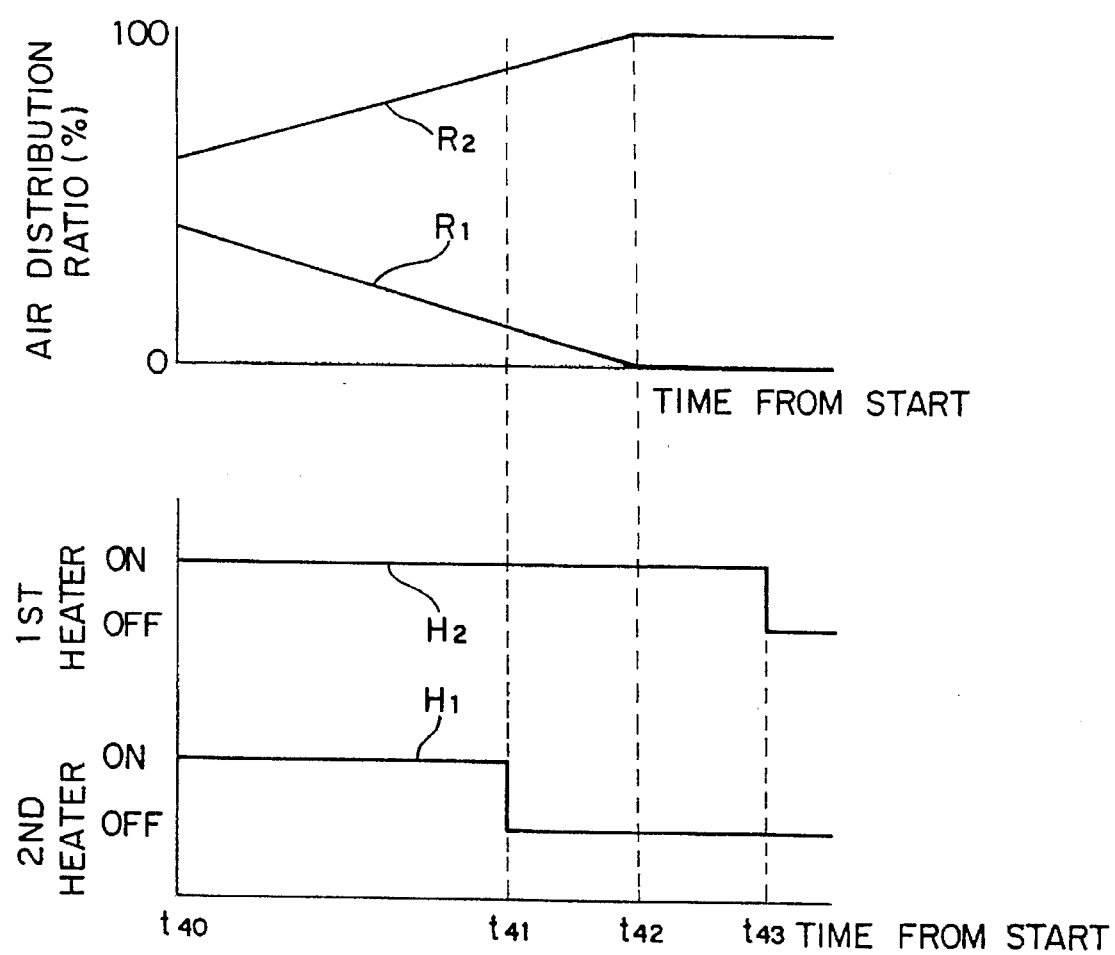
FIG. 20 is a timing chart showing the distribution ratio of the secondary air and the operations of the first and second heaters 23b and 23c, in the case where the distribution ratio of the secondary air is varied gradually on the basis of the length of time from the start of the engine.

FIG. 20 is a timing chart showing the distribution ratio of the secondary air and the operations of the first and second heaters 23b and 23c, in the case where the distribution ratio of the secondary air is varied gradually on the basis of the length of time from the start of the engine. The ratio of the percentage $R_1$ of the secondary air distributed to the first catalytic converter unit 7a to the percentage $R_2$ of the secondary air distributed to the second catalytic converter unit 7b is set equal to the ratio of the capacities of the first and second catalytic converter units 7a and 7b at the time point $t_{40}$ at which the engine is started. Thereafter, the percentage $R_1$ of the secondary air distributed to the first catalytic converter unit 7a is decreased linearly to zero over a predetermined length of time ending at the time point $t_{42}$. The first heater 23b is turned off at the time point $t_{41}$ a predetermined length of time before the time point $t_{42}$. On the other hand, the second heater 23c is turned off at the time point $t_{43}$ a predetermined length of time after the time point $t_{42}$.

As shown in FIGS. 19 and 20, the first heater 23b is turned off at the time point $t_{31}$ (FIG. 19) or the time point $t_{41}$ (FIG. 20) before the percentage $R_1$ of the secondary air distributed to the first catalytic converter unit 7a is reduced to zero. In FIG. 19, the first heater 23b is turned off at the time point $t_{31}$ when the water temperature reaches a predetermined level. In FIG. 20, the first heater 23b is turned off at the time point $t_{41}$ when a predetermined length of time from the start of the engine (at the time point $t_{40}$) is terminated (at the time point $t_{41}$). The over-heating of the first heater 23b which may result from the decreasing amount of air supplied thereto can thus be prevented. The failure of the first heater 23b such as the disconnection of the wire can thus be avoided. The heat remaining in the first heater 23b after it is turned off is sufficient for heating the secondary air introduced to the first catalytic converter unit 7a. Thus the exhaust gas is introduced thereto is not cooled by the secondary air. The difference in the water temperatures corresponding to the time point $t_{31}$ and time point $t_{32}$ in FIG. 19, or the length of time between the time point $t_{41}$ and time point $t_{42}$ in FIG. 20, is selected to ensure that the heat remaining after the first heater 23b is turned off is sufficient for heating the secondary air introduced to the first catalytic converter unit 7a.

Figure 21:
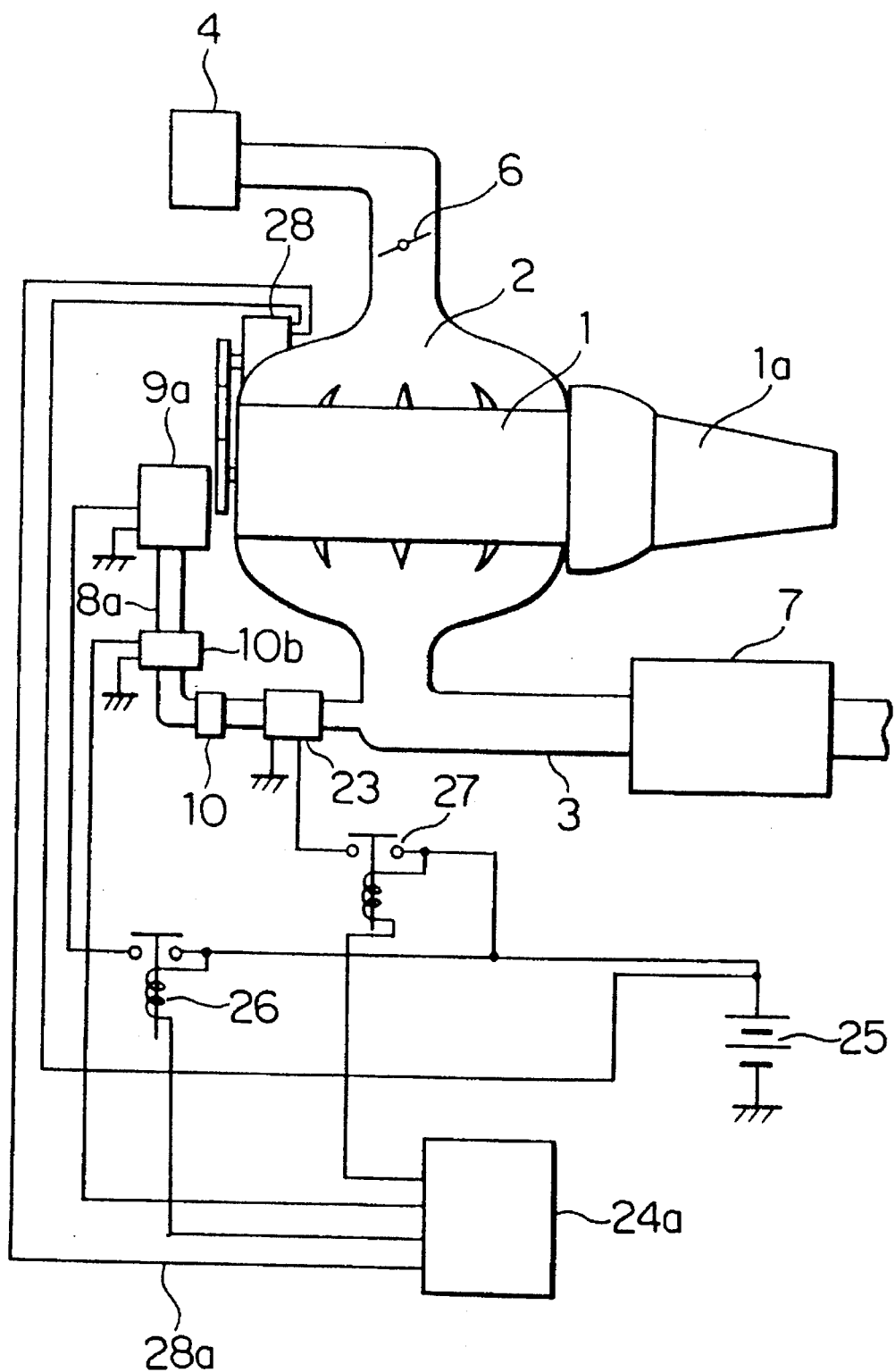
FIG. 21 is a block diagram showing an internal combustion engine provided with a catalytic converter supplied with heated secondary air through an air introduction pipe, wherein the operation of the AC generator 28 (i.e., the generation of electric power) is suspended while the electric air pump 9a or the heater 23 is operated.

FIG. 21 is a block diagram showing an internal combustion engine provided with a catalytic converter supplied with heated secondary air through an air introduction pipe, wherein the operation of the AC generator 28 (i.e., the generation of electric power) is suspended while the electric air pump 9a or the heater 23 is operated. The arrangement of FIG. 21 is similar to that of FIG. 3, except where stated otherwise.

The controller unit 24a controls the position of the flow control valve 10b and the ON/OFF of the relays 26 and 27. Further through a signal line 28a, the controller unit 24a controls the operation (i.e., the generation of electric power) of the AC generator 28.

Next the operation of the system of FIG. 21 is described. Simultaneously with, or after a predetermined length of time after, the start of the engine, the controller unit 24a turns on the relay 26 for the electric air pump 9a, thereby supplying power from the battery 25 to the electric air pump 9a. The electric air pump 9a is thus driven and introduces the secondary air into the exhaust pipe 3 through the air introduction pipe 8a. Further, simultaneouly with, or after a predetermined length of time after, the start of the engine, the controller unit 24a turns on the relay 27 for the heater 23 (which, for example, may be a resistance heater), thereby supplying power from the battery 25 to the heater 23. The heater 23 thus heats the secondary air before it is introduced into the exhaust pipe 3. The amount of secondary air introduced into the exhaust pipe 3 is controlled by means of the flow control valve 10b. The secondary air is preferably heated to a temperature (usually from 300 to 400 degrees centigrade) that is higher than the temperature of the exhaust gas produced immediately after the start of the engine.

The secondary air introduced into the exhaust pipe 3 is supplied to the catalytic converter unit 7 together with the exhaust gas. The temperature rise of the catalytic converter 7 is thus accelerated by the heated secondary air supplied thereto, and the catalyst reaches quickly to the activation or reaction temperature thereof. The noxious components CO and HC contained in the exhaust gas is converted into innocuous components $CO_2$ and $H_2O$ at the catalytic converter unit 7 and the cleaned exhaust gas is released to the atmosphere.

The introduction of the secondary air heated by the heater 23 and driven by the electric air pump 9a usually continues until the catalytic converter is activated and the exhaust gas is stably cleaned. This usually extends over several minutes.

When either the electric air pump 9a or the heater 23 is being operated, the controller unit 24a outputs via a signal line 28a a power generation stop command to the AC generator 28 and stops the power generation of the AC generator 28. On the other hand, when neither the electric air pump 9a nor the heater 23 is being operated, the controller unit 24a outputs via a signal line 28a a power generation command to the AC generator 28 and operates the AC generator 28 to generate power. The battery 25 is charged during the time the AC generator 28 generates power.

Thus, the power generation operation of the AC generator 28 is stopped when the electric air pump 9a or the heater 23 is in operation. The heavy load imposed by the AC generator 28 on the internal combustion engine 1 if the AC generator 28 is operated when the electric air pump 9a or the heater 23 is in operation can thus be eliminated, thereby suppressing the increase of the amount of the noxious components, especially under low output power condition of the engine. Further, the operation of the engine under low output power condition (e.g., when the engine is idling) is rendered more stable. On the other hand, the battery 25 can be charged sufficiently while the electric air pump 9a and the heater 23 are not operated.

In the case of the above embodiment of FIG. 21, the generation of power by the AC generator 28 is stopped when either the electric air pump 9a or the heater 23 is operated. This suspension of the generation of power by the AC generator 28 may only be performed during a predetermined length of time after the start of the engine. Namely, for a predetermined length of time, e.g., for about several tens of seconds, after the start of the engine, the temperature of the engine is still low and the circulation system thereof is not in good order. Thus, the rotation of the engine is still unstable. In a preferred embodiment, only during this initial low temperature period in which the rotation of the engine is unstable, the generation of power by the AC generator 28 is stopped when either the electric air pump 9a or the heater 23 is operated. By limiting the suspension of the generation of power within a brief initial period, the chance of overdischarging the battery 25 can effectively eliminated.

Figure 22:
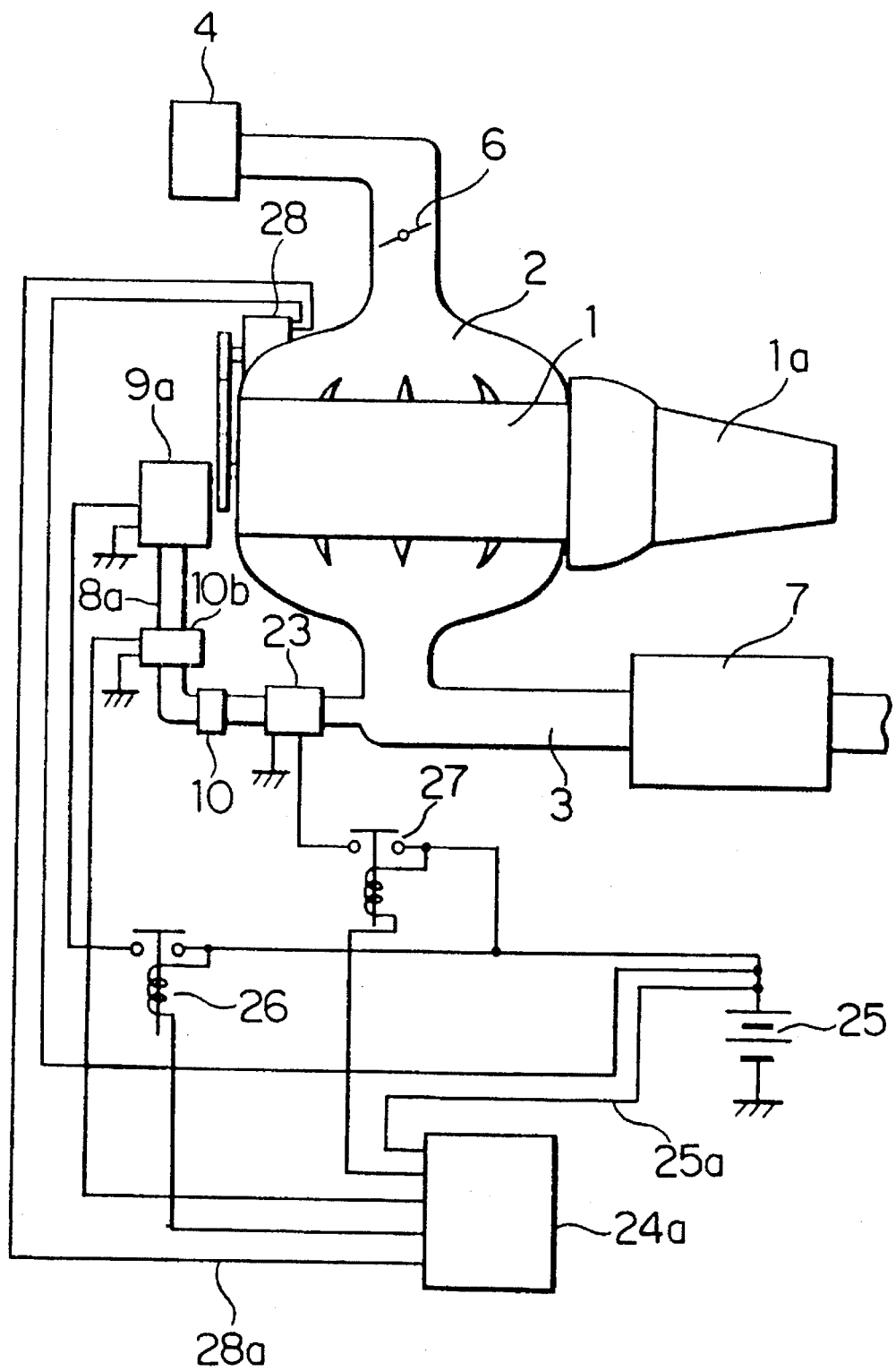
FIG. 22 is a block diagram showing an internal combustion engine provided with a catalytic converter supplied with heated secondary air through an air introduction pipe, wherein the operation of the AC generator 28 (i.e., the generation of electric power) is suspended while the electric air pump 9a or the heater 23 is operated, but is resumed when the battery voltage falls below a predetermined level.

FIG. 22 is a block diagram showing an internal combustion engine provided with a catalytic converter supplied with heated secondary air through an air introduction pipe, wherein the operation of the AC generator 28 (i.e., the generation of electric power) is suspended while the electric air pump 9a or the heater 23 is operated, but is resumed when the battery voltage falls below a predetermined level. In addition to the parts shown in FIG. 21, the arrangement of FIG. 22 includes a voltage detector line 25a for detecting the voltage of the battery 25. As in the case of the embodiment of FIG. 21, the operation of the AC generator 28 is suspended when either the electric air pump 9a or the heater 23 is operated. The controller unit 24a, however, continually monitors the terminal voltage of the battery 25 via the voltage detector line 25a. When the terminal voltage of the battery 25 falls below a predetermined level, the controller unit 24a outputs via the signal line 28a a power generation command to the AC generator 28 and resumes the generation of power by the AC generator 28. Thus, the overdischarge of the battery 25 can be effectively prevented, and the reduction in the performance of the electric air pump 9a and the heater 23 resulting from the low voltage level of the battery 25 can be prevented.

What is claimed is:

1. An exhaust gas cleaner system for an internal combustion engine comprising:

a catalytic converter mounted on an exhaust pipe of said internal combustion engine;

an air introduction pipe for introducing secondary air into said exhaust pipe at a point upstream of said catalytic converter;

heater mounted on said air introduction pipe for heating said secondary air introduced into said exhaust pipe; and engine controller for controlling ignition timings of said internal combustion engine, said engine controller retarding said ignition timings at least during a part of an interval in which said secondary air heated by said heater is introduced into said exhaust pipe;

wherein said engine controller terminates retarding said ignition timings before an introduction of said secondary air heated by said heater is terminated.

2. An exhaust gas cleaner system for an internal combustion engine as claimed in claim 1, wherein said engine controller retards said ignition timing intermittently.

3. An exhaust gas cleaner system for an internal combustion engine, comprising:

- a catalytic converter mounted on an exhaust pipe of said internal combustion engine;
- an air introduction pipe for introducing secondary air into said exhaust pipe at a point upstream of said catalytic converter;
- heater mounted on said air introduction pipe for heating said secondary air introduced into said exhaust pipe; and
- engine controller for controlling ignition timings of said internal combustion engine, said engine controller retarding said ignition timings at least during a part of an interval in which said secondary air heated by said heater is introduced into said exhaust pipe;

wherein said engine controller retards said ignition timing intermittently;

wherein said internal combustion engine is a multi-cylinder internal combustion engine and said engine controller comprises an ignition counter for counting a number of occurrences of successive ignitions of cylinders of said multi-cylinder internal combustion engine, said ignition counter being reset to zero when said number of occurrences of successive ignitions reaches a predetermined number; and wherein said engine controller retards ignition timings if and only if said number of occurrences of successive ignitions counted and stored in said ignition counter falls within a predetermined range.

4. An exhaust gas cleaner system for an internal combustion engine as claimed in claim 3, wherein said engine controller terminates retarding said ignition timings before an introduction of said secondary air heated by said heater is terminated.

* * * * *